(12) United States Patent
Morse et al.

(10) Patent No.: US 7,335,717 B2
(45) Date of Patent: *Feb. 26, 2008

(54) METHODS, COMPOSITIONS, AND BIOMIMETIC CATALYSTS FOR THE SYNTHESIS OF SILICA, POLYSILSEQUIOXANES, POLYSILOXANES, NON-SILICON METALLOID-OXYGEN NETWORKS, POLYMETALLO-OXANES, AND THEIR ORGANIC OR HYDRIDO CONJUGATES AND DERIVATIVES

(75) Inventors: Daniel E. Morse, Santa Barbara, CA (US); David Kisailus, Goleta, CA (US); Kristian M. Roth, Montecito, CA (US)

(73) Assignee: The Regents of the University of California, Oakland, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 10/807,004

(22) Filed: Mar. 22, 2004

(65) Prior Publication Data
US 2005/0090634 A1    Apr. 28, 2005

Related U.S. Application Data

(63) Continuation-in-part of application No. 10/727,232, filed on Dec. 2, 2003, now abandoned.

(51) Int. Cl.
*C08G 77/08* (2006.01)
(52) U.S. Cl. .................. 528/4; 528/9; 528/12; 528/21; 528/23; 528/39; 528/31; 528/43; 528/394; 528/395; 423/608; 423/618; 423/326; 423/339; 435/188.5
(58) Field of Classification Search .................. 528/21, 528/12, 23, 39, 4, 9, 31, 43, 394, 395; 423/326, 423/339, 608, 618; 435/188.5
See application file for complete search history.

(56) References Cited

U.S. PATENT DOCUMENTS 6,670,438 B1 * 12/2003 Morse et al. .................. 528/21

OTHER PUBLICATIONS

Webster's Dictionary, definition "alkoxide", "alkoxyl", 1993.*

* cited by examiner

*Primary Examiner*—Margaret G. Moore
(74) *Attorney, Agent, or Firm*—Berliner & Associates

(57) ABSTRACT

The in vitro polymerization of silica, silicone, non-silicon metalloid-oxane and metallo-oxane polymer networks, by combining a catalyst and a substrate to polymerize the substrate to form silica, polysiloxanes, polymetalloid-oxanes polymetallo-oxanes (metal oxides), polyorganometalloid oxanes, polyorganometallo oxanes, and the polyhydrido derivatives thereof, at about neutral pH. The nanostructure-directing catalysts have a nucleophilic functionality and a hydrogen-bonding acceptor group, and include: silicateins, enzymes that work by a mechanism functionally related to that of the silicateins; self-assembling peptides related to those synthesized and demonstrated capable of acting as biomimetic substitutes for the silicateins; non-peptide-based synthetic polymers containing a nucleophilic group and a hydrogen bonding amine such that the polymer functions by a mechanism of action related to that of the silicateins; materials having such chemical functionality as a nucleophilic group and or a hydrogen bonding amine which, acting in concert with nanoconfinement and or chemical functionality of the surface or matrix to which the functionality is attached, acts catalytically by a mechanism related to that of the silicateins; and small-molecule non-polymeric biomimetic catalysts that operate by the same mechanism as silicateins.

53 Claims, 13 Drawing Sheets

1μm
3.5KV X33,000 8mm

1μm
414619 3.5KV X33,000 24mm

1μm
3.5KV X18,000 7mm

1μm
3.0KV X45,000 15mm

1μm
0020 3.5KV X4,500 15mm

1μm
0014 3.5KV X4,300 15mm

——— 200μm

——— 1μm
3.0KV X6,500 14mm

| Catalyst | Temp | Polymorph | Av. Crystal Size (nm) |
|---|---|---|---|
| Silicatein | 400 | Anatase | 2.0 |
| | 600 | Anatase | 9.1 |
| | 800 | Anatase | 19.0 |
| | 850 | 3% Anatase 97% Rutile | 54.2 |
| Base | 600 | Anatase | 13.5 |
| | 700 | 98% Anatase 2% Rutile | 22.6 |
| | 800 | 40% Anatase 60% Rutile | 34.1 42.0 |
| | 850 | Rutile | 53.1 |
| None | 600 | Anatase | 4.5 |
| | 800 | 10% Anatase 90% Rutile | 32.0 |
| | 850 | Rutile | 44.8 |

FIG. 13

METHODS, COMPOSITIONS, AND BIOMIMETIC CATALYSTS FOR THE SYNTHESIS OF SILICA, POLYSILSEQUIOXANES, POLYSILOXANES, NON-SILICON METALLOID-OXYGEN NETWORKS, POLYMETALLO-OXANES, AND THEIR ORGANIC OR HYDRIDO CONJUGATES AND DERIVATIVES

CROSS REFERENCE TO RELATED APPLICATIONS

This application is a Continuation-In-Part of U.S. patent application Ser. No. 10/727,232, filed Dec. 2, 2003 now abandoned and is also a Continuation-In-Part of U.S. patent application Ser. No. 10/278,491, filed Oct. 22, 2002 now abandoned, both of which are continuations of U.S. patent application Ser. No. 09/856,599, filed Jul. 16, 2001 now U.S. Pat. No. 6,670,438, itself based on International Application Number PCT/US99/30601 having an international filing date of Dec. 18, 1999, which in turn claims the benefit of Provisional Patent Application No. 60/112,944, filed Dec. 18, 1998, This application is also is a Continuation-In-Part of U.S. patent application Ser. No. 10/478,118, filed Sep. 11, 2002, pending, itself based on International Application Number PCT/US01/1 1481 having an international filing date of Apr. 4, 2001, which in turn claims the benefit of Provisional Patent Application No. 60/194,568, filed Apr. 4, 2000.

STATEMENT REGARDING FEDERALLY FUNDED RESEARCH OR DEVELOPMENT

This invention was made with Government support under Grant No. N0014-93-10584, awarded by the Office of Naval Research; Grant No. DAAH-04-96-1-0443 awarded by the Army Research Office; Grant No. NA36RG0537, awarded by the National Oceanic and Atmospheric Administration; and Grant Nos. DMR32716 and DMR34396, awarded by the National Science Foundation. The Government has certain rights in this invention.

BACKGROUND OF THE INVENTION

Silicon, the second most abundant element on Earth, is widely used in the manufacture of siloxane-based semiconductors, glasses, ceramics, plastics, elastomers, resins, mesoporous molecular sieves and catalysts, optical fibers and coatings, insulators, moisture shields, photoluminescent polymers, and cosmetics [Auner, N. and Weis., J. (1998) *Organosilicon Chemistry III: From Molecules to Materials*, Wiley WCH; Auner, N. and Weis., J. *Organosilicon Chemistry IV: From Molecules to Materials*, Wiley WCH (in press); and Ball, P. (1997) *Made to Measure: New Materials for the 21$^{st}$ Century*, Princeton University Press, Princeton, N.J., USA]. The manufacture of these materials typically requires high temperatures or the use of caustic chemicals.

By contrast, the biological production of amorphous silica, the simplest siloxane [$(SiO_2)_n$], is accomplished under mild physiological conditions, producing a remarkable diversity of exquisitely structured shells, spines, fibers, and granules in many protists, diatoms, sponges, molluscs and higher plants [Simpson, T. L. and Volcani, B. E. (1981) *Silicon and Siliceous Structures in Biological Systems*, Springer-Verlag; and Voronkov, M. G., Zelchan, G. I. and Lukevits, E. J. (1997) *Silicon and Life* (2$^{nd}$ edn), Zinatne Publishing, Vilnius, Lithuania]. These biologically produced silicas exhibit a genetically controlled precision of nanoscale architecture that, in many cases, exceeds the capabilities of present-day human engineering. Furthermore, the biological production of siloxanes occurs on an enormous scale globally, yielding gigatons per year of silica deposits on the floor of the ocean. Diatomaceous earth (composed of the nanoporous skeletons of diatoms) is mined in great quantities from the vast primordial deposits of this biogenic silica.

Biotechnical approaches are now starting to unlock the molecular mechanisms of polysiloxane synthesis under physiological conditions, offering the prospect of new, environmentally benign routes to the synthesis and structural control of these important materials. Taking advantage of marine organisms that produce large relative masses of biogenic silica, molecular biologists have begun to isolate the genes and proteins controlling silica biosynthesis and nanofabrication.

Hildebrand and colleagues made a significant breakthrough by cloning and characterizing the cDNA encoding the first silicic-acid [$Si(OH)_4$] transporter to be unequivocally identified [Hildebrand, M., Volcani, B. E., Gassman, W., & Schroeder, J. I. (1997) *Nature* 385, 688-689]. They showed, by analysis of the encoded protein and by injection of the mRNA (synthesized in vitro from the cloned cDNA) into *Xenopus* eggs, that the transporter protein forms a sodium-dependent transmembrane ion channel that mediates the transport of silicic acid. The action of this protein can account for the uptake of the silica precursor from the dilute pool of silicic acid in oceanic and fresh water, and similar transporters may pump silicic acid (or its conjugates) into the lumen of the silica-deposition vesicle (silicalamella), in which polycondensation (polymerization) is known to occur.

Kröger and colleagues have cloned and characterized cDNAs encoding two families of protein (at least one of which is glycosylated) that contribute to the organic sheath surrounding the silica walls of a diatom [Kröger, N., Bergsdorf, C. and Sumper, M. (1994) *EMBO J.* 13, 4676-4683; and Kröger, N., Lehmann, G., Rachel, R. and Sumper, M. (1997) *Eur. J. Biochem.* 250, 99-105.]. The proteins most intimately associated with these silica walls contain regularly repeating hydroxyl-rich domains potentially capable of interacting with the growing silica structure [Hecky, R. E., Mopper, K., Kilham, P., & Degens, E. T. (1973) *Mar. Biol.* 19, 323-331; Swift, D. M. & Wheeler, A. P. (1992) *Phycology* 28, 209-213; and Harrison, C. C. (1996) *Phytochemistry* 41, 37-42]. Hecky et al. had proposed that such hydroxyl-rich domains might align silicic-acid monomers, either by condensing with them (with elimination of water) to form covalent adducts or by hydrogen bonding, thus bringing them into favorable juxtaposition for their condensation to form silica. Thermodynamic calculations support the energetic feasibility of such a pathway [Lobel, K. D., West, J. K., & Hench, L. L. (1996) *Mar. Biol.* 126, 353-360].

Other researchers have suggested that various organic conjugates of silicic acid might serve as the proximate substrates for polymerization in vivo. Silicon catecholates have been used by Perry et al. in extensive studies of silica polymerization promoted by sugars and polysaccharides from silicified plants (Harrison, C. C. (1996) *Phytochemistry* 41, 37-42; Harrison, C. C., & Loton, N. J. (1995) *J. Chem. Soc.-Faraday Trans.* 91, 4287-4297; and Perry, C. C. & Yun, L. J. (1992) *J. Chem. Soc.-Faraday Trans.* 88, 2915-2921), and Mann and his colleagues recently showed that bacterial filaments can direct the deposition of a colloidal silica gel which after calcination yielded a macroporous filamentous material [Davis, S. A., Burkett, S. L., Mendelson, N. H., & Mann, S. (1997) *Nature* 385, 420-423].

In contrast to anthropogenic and geological syntheses of these materials that require extremes of temperature, pressure or pH, living systems produce a remarkable diversity of nanostructured silicates at ambient temperatures and pressures and at near-neutral pH. Laboratory methods have been unable to replicate these results and rely instead on extremes of pH (acid or basic) to condense silica precursors, with surfactants directing the formation of specific morphologies or patterned structures. These conditions are undesirable for environmental reasons and therefore methods to direct silica assembly under conditions similar to those used in nature (i.e. biomimetically) are desired.

Moreover, it would be desirable to extend such biomimetic methods to non-silicon products. Present methods of metal oxide fabrication for the electronics and high-tech industries require capital-intensive "fabrication-line" facilities, the use of high temperatures and high vacuum, and the costly control and remediation of strong acids, bases and other toxic and dangerous chemicals. Attempts to fabricate nanoscale metal oxide features by lithographic methods of etching or stenciling are already reaching the foreseeable limits of resolution. There is a need for an economical way of micro- and nano-fabricating metal oxides without these limitations, and without the environmental hazards of present fabrication techniques, as well as for similarly fabricating other oxides and corresponding nitrides, and their organic or hydrido conjugates and derivatives, and other related materials.

By way of further background, attention is called to the following United States Letters Patent references, each of which is distinguishable from the teachings of the present invention and from the invention in parent application Ser. No. 09/856,599.

U.S. Pat. No. 3,474,070 to Leon Levene teaches a method for hydrolyzing trifunctional organosilanes at neutral pH conditions and using an iron-containing hydrolysis catalyst, in order to produce soluble heat-curable prepolymers for the fabrication of (presumably optical) coatings. There is no contemplation of structure-direction in the formation of the ultimate coatings, i.e., there is no control of the structure of the final material by templating on the surface of the macromolecular catalyst itself. Moreover, the Levene process requires high temperature curing.

U.S. Pat. No. 4,746,693 to Martin G. Meder also teaches a method for producing a coating composition, by the aqueous emulsion hydrolysis of silanes in the presence of a nonionic catalyst and a nonionic fluorochemical surfactant. The Meder process does not take place at neutral pH, and here, too, there is no contemplation of structure-direction in the formation of the final silica films.

U.S. Pat. No. 6,004,444 to Ilhan A. Aksay et al. teaches a method for transferring a microscopic pattern to a silica film during its formation through an involved process in which an acidic aqueous silica precursor solution (including a surfactant) is first "wicked" (by capillary action) into a template and then the hydrolysis reaction is accelerated through the application of an electric field. The process is carried out in contact with a flat polycrystalline substrate that also serves as a template for deposition. There is a high degree of crystallinity and mesoscopic order in the patterned silica structures formed, but this appears to be a consequence of the presence of the template and the kinetics of the hydrolysis in the presence of the heating produced by the applied electric field. The reaction conditions are acidic, not neutral, and any structure-direction is not evidently due to a mechanistic role of the catalyst, i.e. it, is the result of the "molding", or "soft-lithography" described by Aksay et al.

SUMMARY OF THE INVENTION

The present invention overcomes the drawbacks of prior efforts, to provide an unprecedented disclosure of a family of enzymes and their biomimetics that catalyze and structurally direct the formation of silicon oxide, other metalloid oxides, metal oxides, rare-earth oxides, metal nitrides, the corresponding organically substituted derivatives and related materials. Materials that can be produced using the concepts of the present invention are as varied as silicon dioxide, titanium dioxide, zinc oxide, gallium oxide, europium oxide, erbium oxide, gallium nitride, and the like, formed with specific morphologies or patterned micro-or nanoscale structures, and provides heretofore unattainable materials having very desirable and widely useful properties. These materials are prepared at ambient temperatures and pressures and at near-neutral pH. Many of these materials are valuable semiconductors, luminescent display materials and other technologically valuable materials. As an example, titanium dioxide is used industrially as a broad-band semiconductor, as a photo-catalyst in the microelectronic industry, as a photo-voltaic (solar energy converting) material, as well as in a wide variety of other applications in coatings, cosmetics, and the like.

The method of the present invention enables the in vitro polymerization of silica, silicone, non-silicon metalloid-oxane and metallo-oxane polymer networks, and includes combining a catalyst and a substrate to polymerize the substrate to form silica, polysiloxanes, polymetalloid-oxanes, polymetallo-oxanes, or mixed poly(silicon/metallo) oxane materials at about neutral pH.

The nanostructure-directing catalysts used in this invention have a nucleophilic functionality and a hydrogen-bonding acceptor group, and include:

silicateins—from silica proteins—a family of enzymes responsible for the structure-directing polycondensation of silica in biological systems;

enzymes that work by a mechanism functionally related to that of the silicateins;

self-assembling peptides related to those synthesized and demonstrated capable of acting as biomimetic substitutes for the silicateins;

non-peptide-based synthetic polymers containing a nucleophilic group and a hydrogen bonding amine such that the polymer functions by a mechanism of action related to that of the silicateins;

materials having such chemical functionality as a nucleophilic group and or a hydrogen bonding amine which, acting in concert with nanoconfinement and or chemical functionality of the surface or matrix to which the functionality is attached, acts catalytically by a mechanism related to that of the silicateins; and small-molecule non-polymeric biomimetic catalysts that operate by the same mechanism as silicateins.

The substrate is selected from groups consisting of silicon alkoxides, non-silicon metalloid alkoxides or metal alkoxides, and any organic, organometallic or hydrido derivatives of the foregoing; inorganic and organic oxygen-containing chelates of silicon, non-silicon metalloids or metals and any organic, organometallic or hydrido derivatives of the foregoing; and inorganic and organic esters of the hydoxides of silicon, non-silicon metalloids or metals and any organic, organometallic or hydrido derivatives of the foregoing; and inorganic and organic hydolyzable salts, complexes or conjugates of the hydoxides of silicon, non-silicon metalloids or metals and any organic, organometallic and hydrido derivates of the foregoing.

Parent application Ser. No. 09/856,599 now U.S. Pat. No. 6,670,438 (which was filed from International Application Number PCT/US99/30601, published as International Publication Number WO 00/35993 on Jun. 22, 2000, the disclosure of which is incorporated herein by reference) describes the use of biomimetic catalysts, such as silicateins and block copolypeptides, to catalyze and spatially direct the polycondensation of silicon alkoxides, metal alkoxides, and their organic conjugates to make silica, polysiloxanes, poly-metallo-oxanes, and mixed poly(silicon/metallo)oxane materials under environmentally benign conditions. The examples in parent application Ser. No. 09/856,599 now U.S. Pat. No. 6,670,438 were all concerned with the effect of silicatein on silicon alkoxide. Therefore, what is surprising and wholly unprecedented in this disclosure is the demonstration of a family of catalysts that produce other metalloid oxides as well as metal oxides, rare-earth oxides, metal nitrides, the corresponding organically substituted derivatives and related materials from the corresponding hydrolyzable precursors, while simultaneously directing the nanoscale structure of the resulting material.

We refer to the foregoing hydrolyzable precursors as "alkoxide-like" materials. They are hydrolyzed (and their hydrolysis products subsequently condensed) in the same way as are the alkoxides by silicatein and its relatives. These include, for example, but are not confined to, the lactates, acetylacetonates, citrates, succinates, tartarates, gluconates, acetates, formates, nitrates, sulfates, etc. of titanium, gallium, zinc, rubidium, and cobalt, and of the non-silicon metalloids such as germanium.

Thus, the method of the present invention utilizes a family of catalysts that produce metal, non-silicon metalloid and rare earth oxides and nitrides, and their organic or hydrido conjugates and derivatives from corresponding organosilicon and hydrido-silicon alkoxides and alkoxide-like precursors, while simultaneously directing the nanostructure of the resulting material.

This is the first biotechnological route yet discovered for catalysis of the nanofabrication of the metal oxides (and subsequent conversion to the metal nitrides), and offers an economical, low temperature and environmentally benign alternative to present methods of fabrication for the electronics and other industries which require capital-intensive "fabrication-line" facilities, and the use of high temperatures, high vacuum, and the costly control and remediation of strong acids, bases and other toxic and dangerous chemicals.

Advantages of the invention include: (a) the ability to control nanoscale features of the aforementioned materials at the time of synthesis (i.e., provide "bottom-up nanofabrication"), using structure-directing scaffolds; (b) catalysis of the synthesis of the aforementioned oxides at low temperature; (c) catalysis of the synthesis of the aforementioned oxides at ambient pressure, and (d) catalysis of the synthesis of the aforementioned oxides at or near neutral pH.

The potential value for semiconductor and electronic/luminescent display manufacture is significant: rather than attempting to "etch down" or stencil nanoscale features of these materials (by lithographic methods already reaching the foreseeable limits of resolution) to make smaller and faster components, the invention disclosed here offers the possibility of constructing nanoscale features of these materials from the bottom up—an objective of high priority in the National and International Semiconductor Roadmap.

BRIEF DSCRIPTION OF THE DRAWINGS

These and other features, aspects, and advantages of the present invention will become better understood with regard to the following description, appended claims, and accompanying drawings, where:

As related to the silicified structures of parent application Ser. No. 09/856,599:

FIG. 1 shows scanning electron micrographs of the products of reactions between silicon alkoxides and silicatein or cellulose filaments: (A) silicatein filaments prior to reaction, (B) silicatein filaments after 12 h reaction with tetraethyl orthosilicate (TEOS) (1.0 ml; 4.5 mmoles) plus Tris-HCl buffer, (C) air-dried silicatein filaments incubated with TEOS as in (B) but with no additional water, (D) silicatein filaments after 8 h reaction with phenyltriethoxysilane (1.0 ml; 4.1 mmoles) plus Tris-HCl buffer, (E) cellulose fiber, and (F) cellulose fiber after 12 h reaction with TEOS as in (B);

FIG. 2 shows $^{29}Si$ magic-angle spinning (MAS) NMR spectra of silica and silsesquioxane products on silicatein filaments [Schwab, D. W. & Shore, R. E. (1971) *Biol. Bull.* 140,125-136], in which the samples were prepared as described for FIGS. 1B and D: (A) A single-pulse MAS spectrum of the reaction product of silicatein filaments and TEOS, and (B and C) Cross-polarization MAS spectra of the reaction products of silicatein filaments and phenyltriethoxysilane (B) and TEOS (C) respectively;

Figure 6:
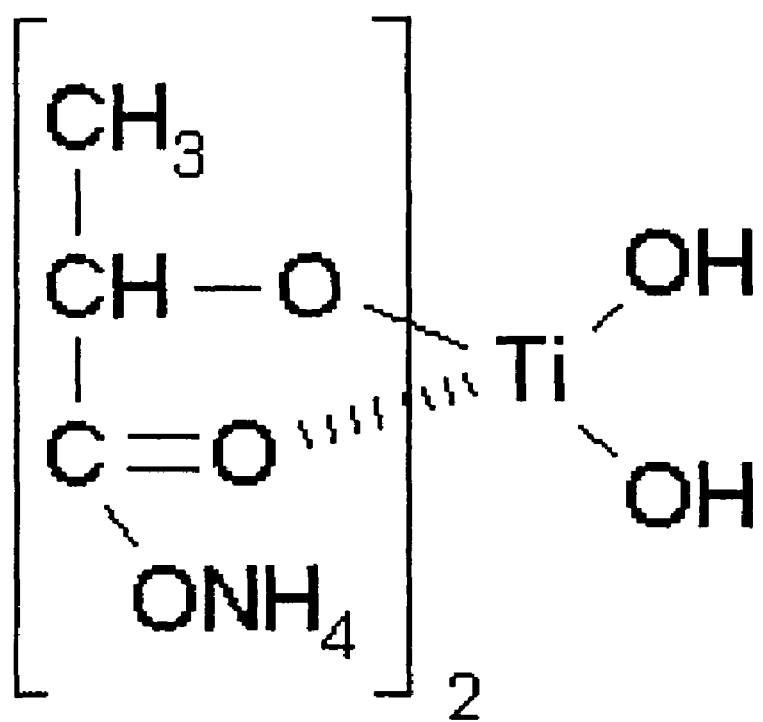
Figure 7A:
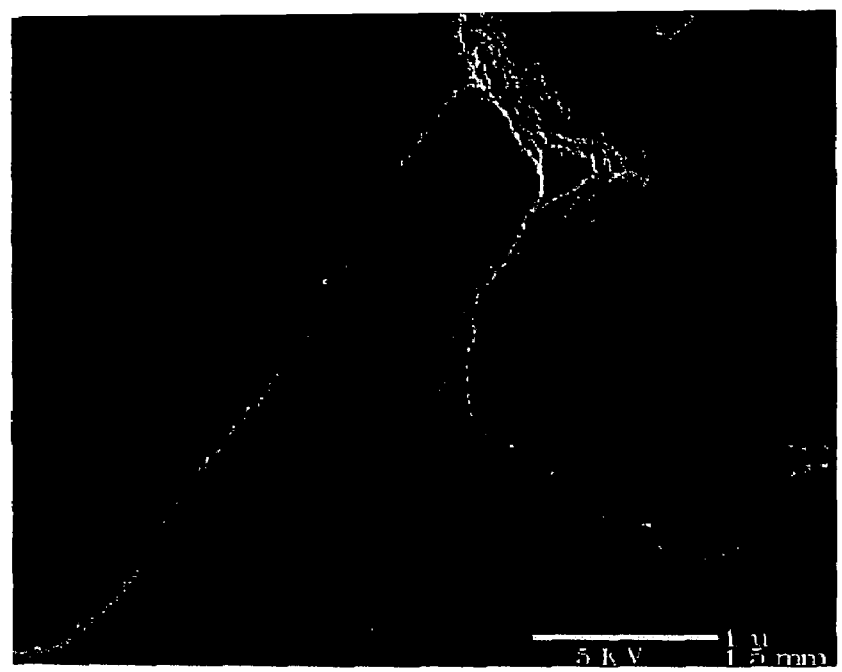
Figure 7B:
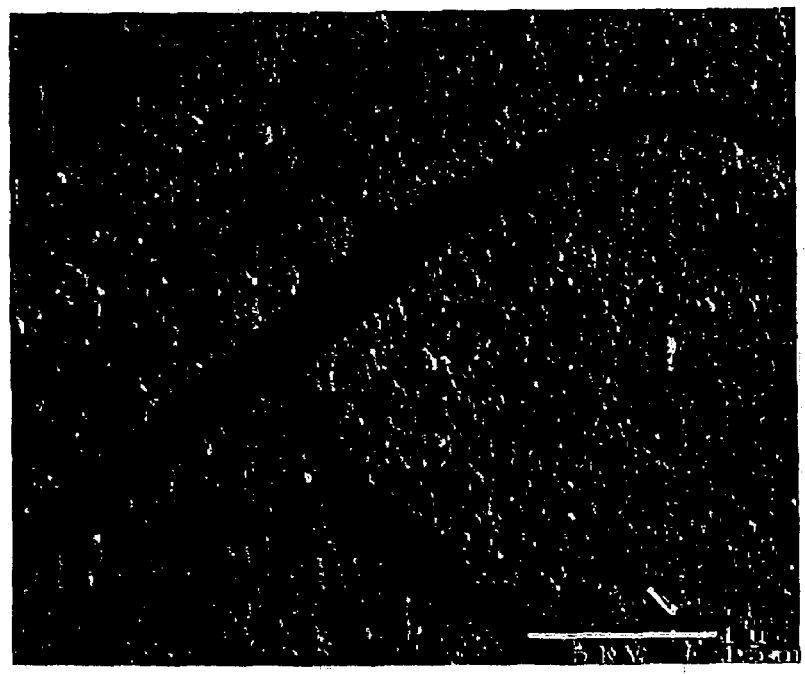
Figure 8:
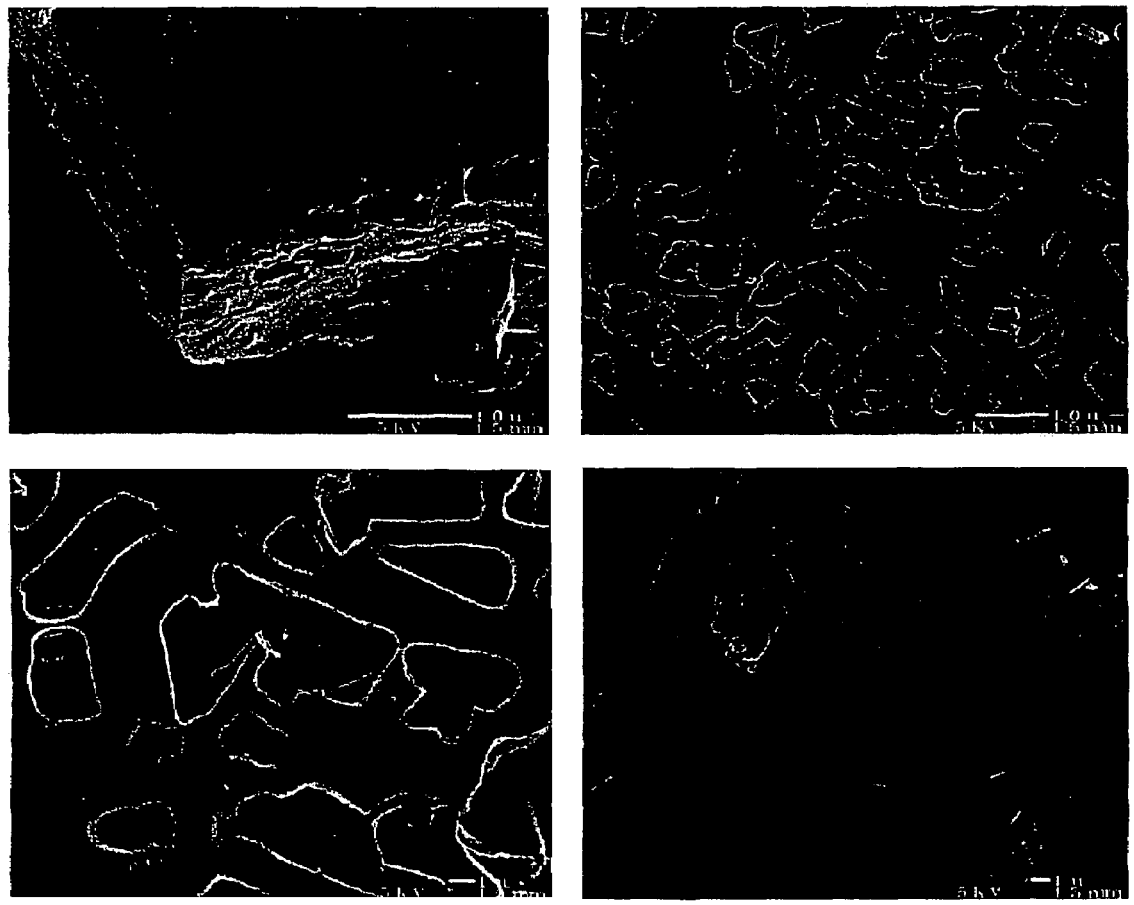
Figure 9:
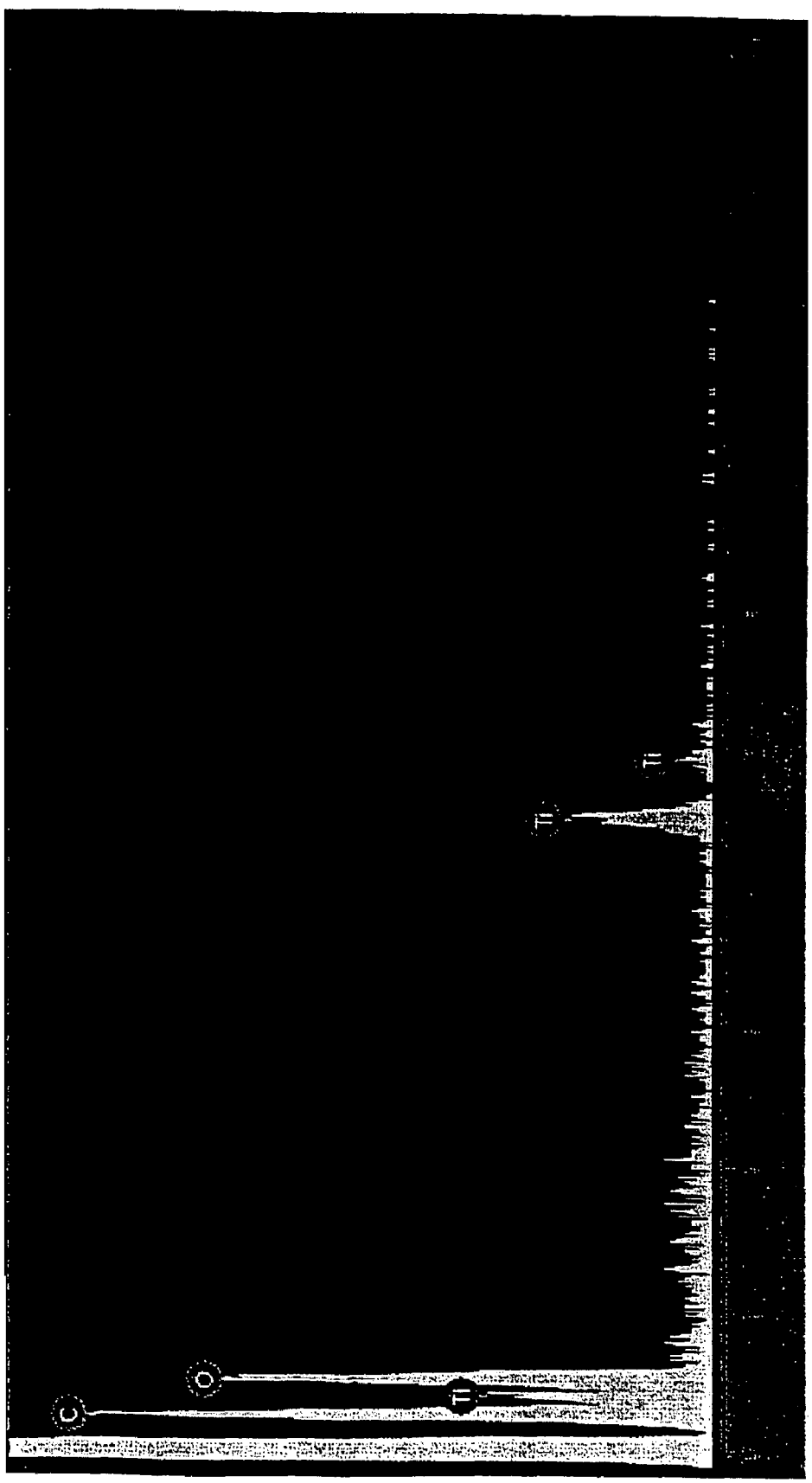
Figure 10:
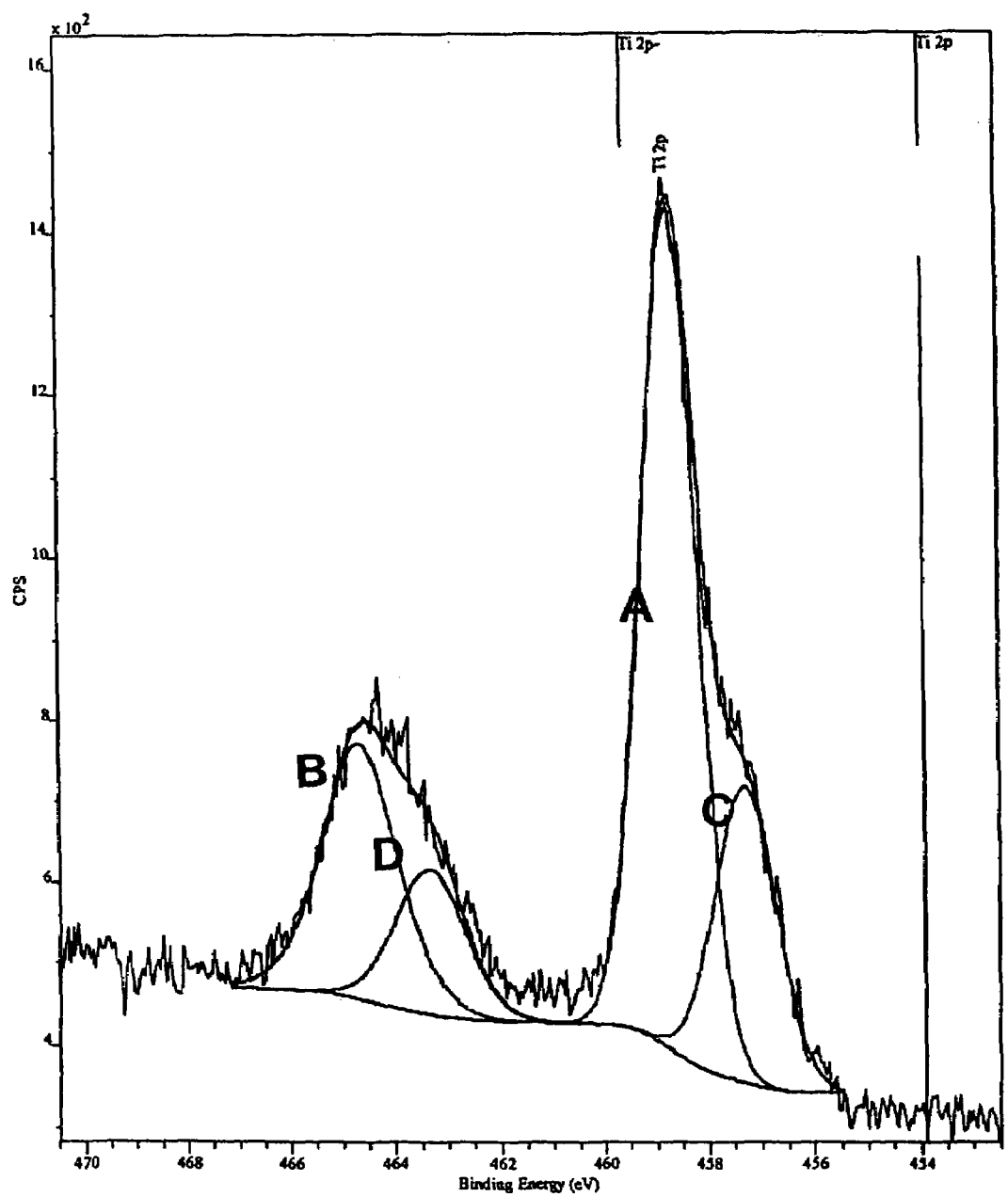
Figure 11:
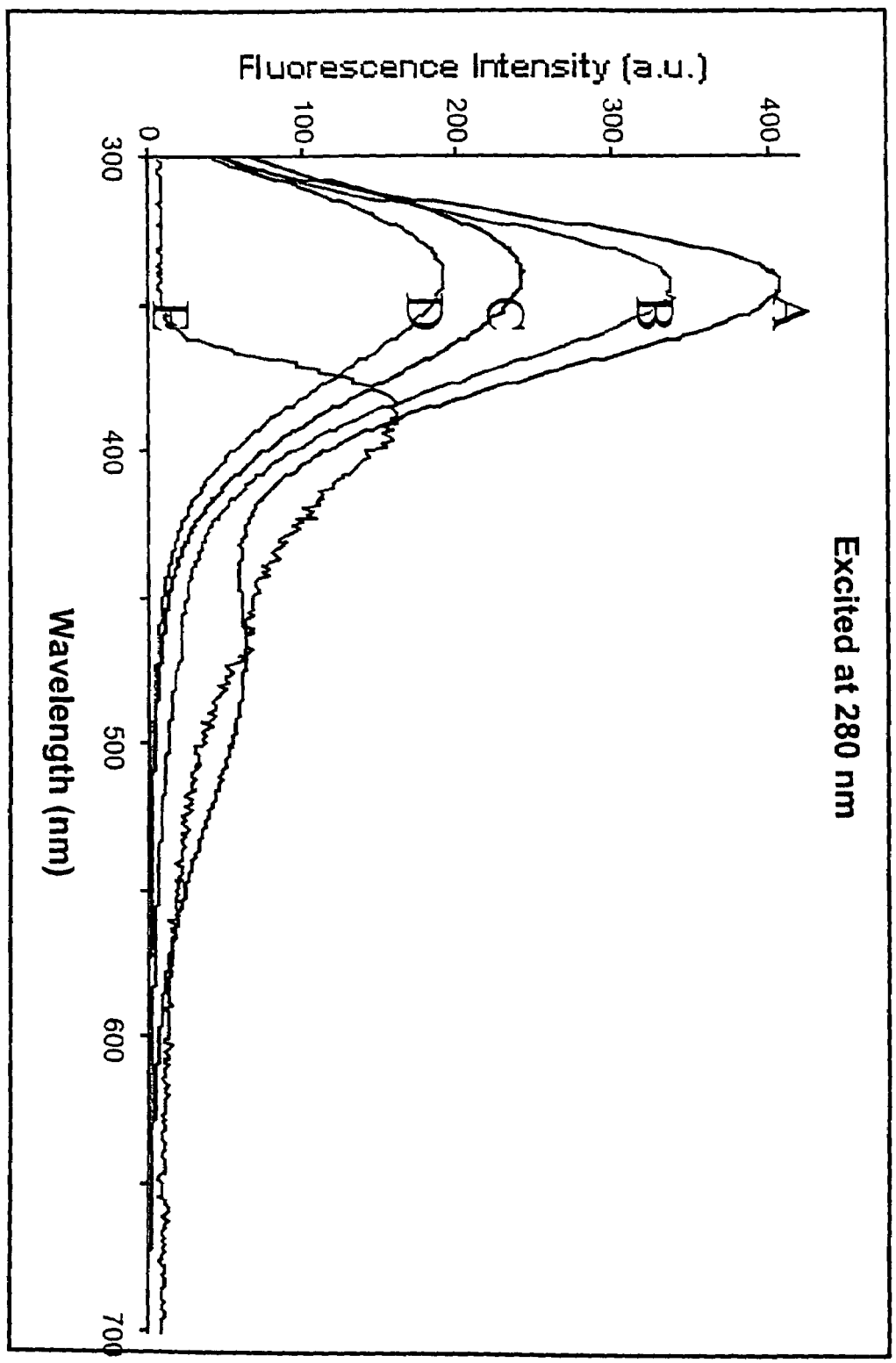
Figure 12:
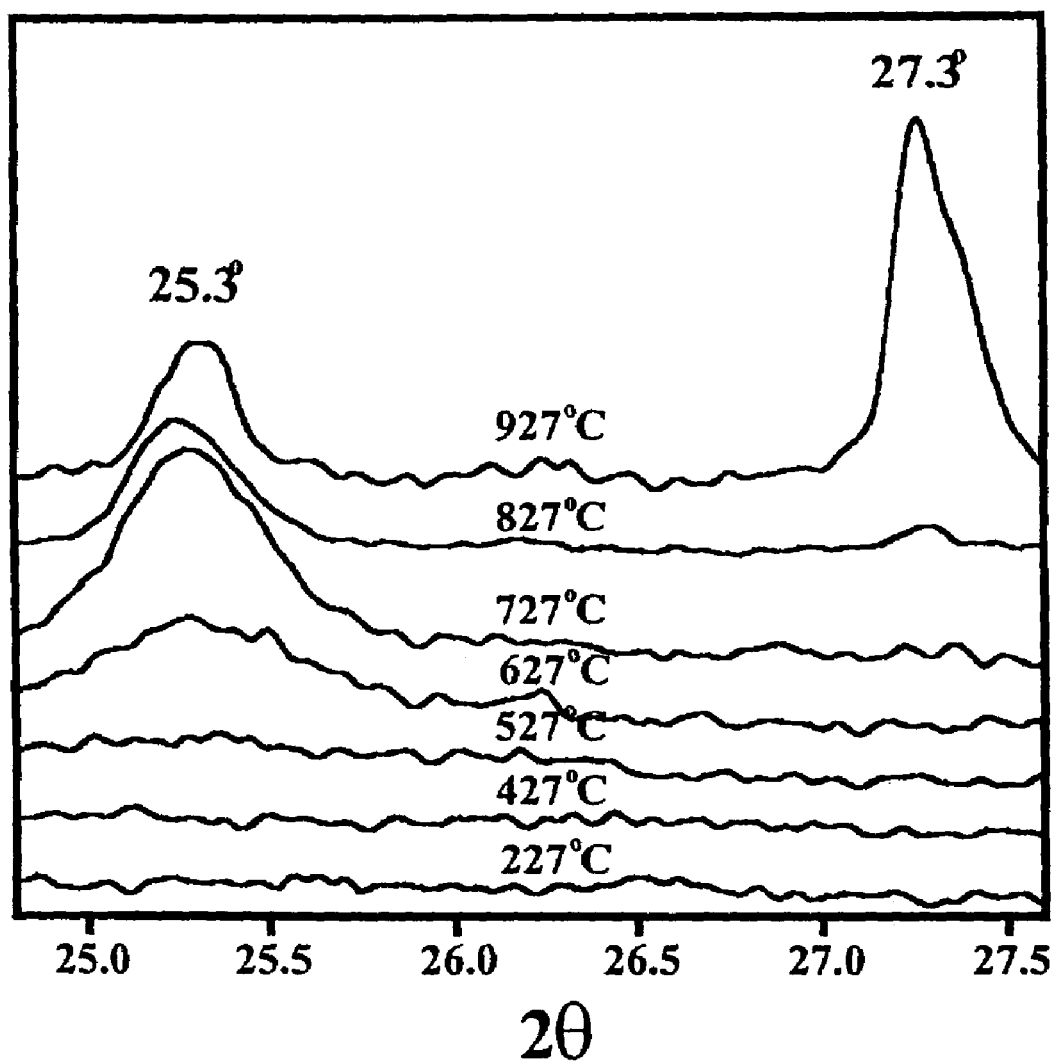

As related to the present structures:

FIG. 6 is the structural formula for titanium (iv)bis (ammonium lactato)-dihydroxide (TBALDH);

FIG. 7A is a scanning electron microscope image of the result of catalyzing TBALDH hydrolysis and polycondensation with silicatein proteins;

FIG. 7B is a scanning electron microscope image of the result of catalyzing TBALDH hydrolysis and polycondensation with sodium hydroxide;

FIG. 8 shows four scanning electron microscope images of a titanium dioxide hybrid obtained by reacting TBALDH with silicatein proteins;

FIG. 9 is an energy dispersive spectrometer spectrum of a titanium dioxide hybrid prepared as in FIG. 7A;

FIG. 10 shows an X-ray photoelectron spectroscopy spectrum of samples prepared as in FIG. 9;

FIG. 11 shows the fluorescence of silicatein/$TiO_2$ combinations or hybrids after excitation at 280 nm, where A is the silicatein plus TBALDH, B is the denatured silicatein plus TBALDH, C is the silicatein alone, D is denatured silicatein alone, and E is TBALDH;

FIG. 12 shows thermal annealing to anatase and rutile wherein the reactions were performed as in FIG. 7 and subsequently heated; and FIG. 13 is a table showing polymorph and crystal size resulting from annealing $TiO_2$ synthesized from TBALDH with silicatein protein catalyst, ammonium hydroxide catalyst, and with heat alone.

DETAILED DESCRIPTION

This invention provides a simple and general procedure for the in vitro catalytic syntheses of silicon and non-silicon metalloid-oxane and metallo-oxane, or mixed poly(silicon/metallo)oxane, polymer networks, or their hydrido, organic, or organometallic derivatives, under environmentally benign conditions. Structure-directing activity is provided by a spatial array of structure-directing determinants contained on or within a catalyst that can be any of the families of proteins, enzymes, peptides, non-peptide-based polymers, small molecules, supramolecular aggregates, filaments, or arrays or assemblies thereof, acting in conjunction with the surfaces of any planar, tubular, mesoporous or other solid support substrate to which the catalysts are attached or in which said catalysts are confined. The precursors with which the catalyst is combined are selected from the group consisting of silicon alkoxides, non-silicon metalloid alkoxides or metal alkoxides, and any organic, organometallic or hydrido derivatives of the foregoing; inorganic and organic oxygen-containing chelates of silicon, non-silicon metalloids or metals and any organic, organometallic or hydrido derivatives of the foregoing; and inorganic and organic esters, hyrdrolyzable salts, complexes or conjugates of the hydoxides of silicon, non-silicon metalloids or metals and any organic, organometallic or hydrido derivatives of the foregoing. As a result, the substrate is polymerized to form silica, polysiloxanes, polymetalloid-oxanes polymetallo-oxanes (metal oxides), polyorganometalloid oxanes, polyorganometallo oxanes, and the polyhydrido derivatives thereof, at about neutral pH.

The nanostructure-directing catalysts used by this invention have a nucleophilic functionality and a hydrogen-bonding acceptor group, whereby to assemble, hydrolyze, and condense the reactant at about neutral pH and at ambient temperature. The catalysts include macromolecular proteins or polypeptides, enzymes, synthetic non-peptide-based polymers, small molecules, supramolecular aggregates, filaments, or arrays or assemblies thereof, and any of the aforementioned used in conjunction or proximity with or attached to surfaces, and are simultaneously catalysts, working at neutral and near-neutral pH and low temperature, and the templates, directing the structure of the final product. Suitable catalysts include:

(1) Any of the Silicateins—a family of functionally related enzymes responsible for the structure-directing polycondensation of silica in biological systems. See:

Shimizu, K., J. Cha, Y. Zhou, G. D. Stucky and D. E. Morse. 1998. Silicatein α: Cathepsin L-like protein in sponge biosilica. Proc. Natl. Acad. Sci. USA 95: 6234-6238; and Cha, J. N., K. Shimizu, Y. Zhou, S. C. Christiansen, B. F. Chmelka, G. D. Stucky and D. E. Morse. 1999. Silicatein filaments and subunits from a marine sponge direct the polymerization of silica and silicones in vitro. Proc. Natl. Acad. Sci USA 96: 361-365. Each of the foregoing references is incorporated herein by reference.

(2) Any of the large family of enzymes that works by a mechanism functionally related to that of the silicateins. Such enzymes include those known as hydrolases, esterases, amidases; lipases, proteases, peptidases, "catalytic triad enzymes"; and any other enzyme functionally related to the above through a similar mechanism of action. See:

Zhou, Y., K. Shimizu, J. N. Cha, G. D. Stucky and D. E. Morse. 1999. Efficient catalysis of polysiloxane synthesis by silicatein α requires specific hydroxy and imidazole functionalities. *Angewandte Chemie Intl. Ed.* 38: 779-782; Morse, D. E. 1999. Silicon biotechnology: Harnessing biological silica production to make new materials. *Trends in Biotechnology,* 17: 230-232; Morse, D. E. 2000. Silicon biotechnology: Proteins, genes and molecular mechanisms controlling biosilica nanofabrication offer new routes to polysiloxane synthesis. In: "Organosilicon Chemistry IV: from Molecules to Materials" (N. Auner and J. Weis, eds.); Wiley-VCH, New York, pp. 5-16.; Morse, D. E. 2001. Biotechnology reveals new routes to synthesis and structural control of silica and polysilsesquioxanes. In: "The Chemistry of Organic Silicon Compounds" (Z. Rappoport and Y. Apeloig, eds.); John Wiley & Sons, New York, vol. 3, pp. 805-819. Each of the foregoing references is incorporated herein by reference.

(3) Any of the self-assembling peptides related to those we synthesized and demonstrated capable of acting as biomimetic substitutes for the silicateins. Such peptides include, but are not confined to, those containing a nucleophilic residue such as cysteine, serine, threonine or tyrosine, and a hydrogen-bonding amine such as histidine, lysine or arginine. See:

Cha, J. N., G. D. Stucky, D E. Morse, T. J. Deming. 2004. Biomimetic synthesis of ordered silica structures by block copolypeptides. Nature 403: 289-292, incorporated herein by reference.

(4) Any non-peptide-based synthetic polymers containing a nucleophilic group and a hydrogen bonding amine such that the polymer functions by a mechanism of action related to that of the silicateins.

(5) Any such chemical functionality as a nucleophilic group and or a hydrogen bonding amine which, acting in concert with nanoconfinement and or chemical functionality of the surface or matrix to which the functionality is attached, acts catalytically by a mechanism related to that of the silicateins.

(6) Any of small-molecule non-polymeric biomimetic catalysts that operate by the same mechanism as silicateins. These are bifunctional catalysts where the nucleophilic functionality is given by, but not confined to, —SH, —OH, etc. The hydrogen-bonding acceptor group can be, but not confined to, —NH, —NH$_2$, etc., and can comprise such structures as cysteamine, hydroxylamine, ethanolamine, hydroxyalkylamines, and mercaptoalkylamines.

The catalysts are used to catalyze and structurally direct the polycondensation (polymerization) of the above non-silicon metalloid-oxane and metallo-oxane, or mixed poly (silicon/metallo)oxane, polymer networks, or their hydrido, organic, or organometallic derivatives, exemplified by (but not confined to) silica, titanium dioxide, titanium dioxide, zinc oxide, poly(phenyl-titanium oxide), polyphenylsilsesquioxane, poly [N-(proply)dansylamide]-silisesquioxane, and a wide variety of poly (organoplatinum) and other organometallic silsesquioxanes. These materials in turn can be used as the precursors for formation of the corresponding nitrides and arsenides, such as (but not confined to) gallium nitride and gallium arsenide. and the like. Catalysis of the polycondensation reaction occurs at low temperature, ambient pressure and at or, near neutral pH.

Preferred protein or polypeptide catalysts include silicatein filaments, silicatein subunits or fragments thereof, oligomers and homopolymers of cysteine, histidine, serine, threonine, tyrosine, lysine or analogs or derivatives thereof, and block copolypeptides containing these residues or derivatives or analogs thereof. Silicatein filaments, and their constituent subunits comprising the axial cores of silica spicules of a marine sponge, chemically and spatially direct the polymerization of silica and silicone polymer networks from the corresponding alkoxide substrates in vitro, under conditions in which such syntheses otherwise require either an acid or base catalyst. A macroscopic silicatein purified from spicules that contain assembled subunits is a "silicatein filament", whereas an isolated silicatein protein molecule is referred to as a silicatein subunit.

Characterization of silicatein alpha (the subunit comprising nearly 70% of the mass of the filaments) and its cloned cDNA revealed that silicatein alpha is homologous to members of the Cathepsin L subfamily of the papain family of proteolytic enzymes. The amino acid sequence of the silicatein alpha subunit is disclosed herein as SEQ ID NO: 1 and the cDNA encoding this sequence is SEQ ID NO:2. Any of the members of the entire superfamily of related enzymes, polymers and even small molecule "biomimetics" can be used. For simplicity, the term "silicatein" is used to describe both the native or wild type silicateins and those silicateins with sequences altered by the hand of man (engineered silicateins). Examples of silicatein subunits include subunits alpha, beta and gamma as described by Shimuzu et al. (1998), supra.

Enzymes useful in the invention include:
Silicatein, proteases, peptidases, esterases, lipases, hydrolases, and the "catalytic triad" family of enzymes.
enzymes related to the molecular structure of silicatein;
enzymes related to the molecular structure of the proteases;
enzymes related to the molecular structure of the peptidases;
enzymes related to the molecular structure of the esterases;
enzymes related to the molecular structure of the lipases;
enzymes related to the molecular structure of the hydrolases; and
enzymes related to the "catalytic triad" family of enzymes.

Peptides useful in the invention include:
peptides containing oligo-lysine or poly-lysine;
peptides containing oligo-serine or poly-serine;
peptides containing oligo-threonine or poly-threonine;
peptides containing oligo-tyrosine or poly-tyrosine;
peptides containing oligo-histidine or poly-histidine;
peptides containing oligo-cysteine or poly-cysteine;
peptides including a nucleophilic catalytic side chain, such as contributed by serine, cysteine, histidine, threonine or tyrosine;
peptides containing derivatives or functional analogs of the aforementioned amino acids; and
peptides including a hydrogen-bonding amine.

Non-peptide-based polymers useful in the invention include:
non-peptide-based polymers that operate by a mechanism of catalysis similar to that utilized by the silicateins;
non-peptide-based polymers containing a nucleophilic site; and
non-peptide-based polymers containing a hydrogen-bonding amine.

The term "wild type" refers to those silicateins that have an amino acid sequence as found in the natural environment. This term therefore refers to the sequence characteristics, irrespective of whether the actual molecule is purified from natural sources, synthesized in vitro, or obtained following recombinant expression of a silicatein-encoding DNA molecule in a host cell.

The terms "mutant, variant or engineered" silicatein refer to those silicateins the amino acid sequence of which have been altered with respect to the sequence of the silicatein found in nature. This term thus describes silicateins that have been altered by the hand of man, irrespective of the manner of making the modification, e.g., whether recombinant DNA techniques or protein chemical modifications are employed.

"Native" silicateins are those that retain the integrity of their three-dimensional structures.

"Recombinant" silicateins are those molecules produced following expression of a silicatein recombinant DNA molecule, or gene, in a prokaryotic or eukaryotic host cell, or even following translation of an RNA molecule in an in vitro translation system. "Synthetic" silicateins are those silicateins produced using synthetic chemistry, most usually in the form of automated peptide synthesis. Both recombinant and synthetic silicateins may have either wild type or mutant sequences, as designed.

Yet another group of preferred catalysts of the present invention, which mimic the polymerizing and scaffolding activities of silicateins, are cysteine-containing block copolypeptides. The most preferred versions the diblock copolypeptides are poly(L-Cysteine$_{10}$-b-L-Lysine$_{200}$), poly (L-Cysteine$_{30}$-b-L-Lysine$_{200}$), poly(L-Cysteine$_{60}$-b-L-Lysine$_{200}$), and poly(L-Cysteine$_{30}$-b-L-Lysine$_{400}$). The catalysts mimic the in vivo activity of proteins that control silicification in marine organisms. For example, the marine sponge, *Tethya aurantia*, produces copious silica spicules (1-2 mm length×30 μm diameter) that constitute 75% of the dry weight of the organism. These spicules each contain a central axial filament of protein (1-2 mm length×2 μm diameter) consisting of three very similar subunits we have named silicateins (for silica proteins) [Shimizu, K., Cha, J., Stucky, G. D., & Morse, D. E. (1998) *Proc. Natl. Acad. Sci.* 95, 6234-6238; incorporated herein by reference in its entirety]. The α, β and γ subunits are quite similar in amino acid composition and pI, with apparent molecular masses of 29, 28, and 27 kDa. Densitometric analysis reveal these subunits to be present in relative proportions of approximately α: β:γ=12:6:1.

The substrate is selected from groups consisting of silicon alkoxides, non-silicon metalloid alkoxides or metal alkoxides, and any organic, organometallic or hydrido derivatives of the foregoing; inorganic and organic oxygen-containing chelates of silicon, non-silicon metalloids or metals and any organic, organometallic or hydrido derivatives of the foregoing; and inorganic and organic esters of the hydoxides of silicon, non-silicon metalloids or metals and any organic, organometallic or hydrido derivatives of the foregoing; and inorganic and organic hydolyzable salts, complexes or conjugates of the hydroxides of silicon, non-silicon metalloids or metals and any organic, organometallic and hydrido derivates of the foregoing.

The substrates comprise alkoxide or alkoxide-like (as we have defined the term) precursors and can include any of a family of:
(1) silicon alkoxides such as but not confined to tetraorthoethoxysilicate;
(2) organosilicon alkoxides such as but not confined to methyl-, phenyl-, or dansylpropyl-triethoxysilane silicon;
(3) hydrido-silicon alkoxides such as but not confined to hydrido-triethoxysilane;
(4) metallo alkoxides such as but not confined to bis (lactato) titanium;
(5) organometallo-alkoxides such as but not confined to phenyl-bis(lactato) titanium;

(6) hydrido metallo-alkoxides such as but not confined to hydrido-bis(lactato) titanium;
(7) metalloid alkoxides such as but not confined to tetraorthoethoxygermanate;
(8) organometalloid alkoxides such as but not confined to methyl-, phenyl-, or dansylpropyl-triethoxygermane; and
(9) hydrido metalloid alkoxides such as but not confined to hydrido-triethoxygermane.

Any metal or metalloid can be used in the metal alkoxide or metalloid alkoxide precursor, including the following:

the transition metals, such as scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, and mercury;

the lanthanide series of the rare earth metals, such as lanthanum, cerium, praseodymium, neodymium, promethium, samarium, europium, gadolinium, terbium, dysprosium, holmium, erbium, thulium, ytterbium, and lutetium;

the actinide series of the rare earth metals, such as actinium, thorium, protactinium, uranium, neptunium, plutonium, americium, curium, berkelium, and californium;

the alkaline earth metals, such as beryllium, magnesium, calcium, strontium, barium, and radium;

the alkali metals, such as lithium, sodium, potassium, rubidium, and cesium;

other metals, such as aluminum, gallium, indium, tin, thallium, lead, and bismuth; and the non-silicon metalloids, such as boron, germanium, arsenic, antimony, tellurium, and polonium.

Polymerization Products

The catalyst acts on the substrate to form as products: the corresponding silica, polysiloxanes, polymetalloid-oxanes polymetallo-oxanes (metal oxides), polyorganometalloid oxanes, polyorganometallo oxanes, and the polyhydrido derivatives thereof, at about neutral pH.

Silicified structures assume a shape directed by the scaffolding activity of the catalyst. Such silicified structures can include shapes, such as filaments, spheres, elongated globules, and columns. The catalyst displaces alkanol from an alkoxide or alkoxide-like substrate facilitating solvolysis to initiate structure-directed hydrolysis and subsequent condensation with another alkoxide or alkoxide-like material at neutral or near neutral pH to form a dioxane, oligo-oxane, or polyoxane product. The structure-directed condensation is by nucleophilic attack wherein the nucleophilic group forms a, preferably covalent, transitory intermediate in facilitating solvolysis. Preferably, the catalyst comprises a group that interacts with the nucleophilic group to increase its nucleophilicity, e.g., by hydrogen bonding.

Potential applications for the reaction products include, but are not limited to, resin toughening, electronic and optoelectronic devices, packaging, insulators, fire-resistant materials, construction materials, plastics, metalloplastic composites, adhesives, water-resistant sealants, and filtration membranes. Representative examples include: the synthesis of silica, poly-methyl-silsesquioxane and poly-phenyl-silsesquioxane catalyzed and spatially directed by silicatein filaments, subunits, and subunit α produced in bacteria from a recombinant DNA template. Additional examples include the catalysis and spatial control of silica and polysilsesquioxane synthesis by block copolypeptides and other polymers, polycondensation to poly(phenyl-titanium oxide), and use as precursors for the formation of corresponding nitrides such as gallium nitride.

The following will provide further details as to the structure and mechanism of action of the silicatein catalysts, their method of their preparation and of the preparation of synthetic polypeptide catalysts, and details relating to small molecule non-polymeric biomimetic catalysts that operate by the same mechanism as silicateins.

Sturctural and Functional Domains of Silicatein Catalysts

Analysis of the amino acid sequence revealed that silicatein α is made biosynthetically as a "pre-pro-protein:, with two peptide fragment successively removed from the amino-terminal end by proteolytic enzymes that cut the protein as it is secreted into the membrane-enclosed silica deposition vesicle (SDV) and then folded into its final 3-dimensional conformation. The "signal peptide" that facilitates recognition and secretion into the SDV is cleaved by a specific "signal peptidase". After folding the protein within the SDV, the remaining N-terminal "propeptide" is then removed to release the mature silicatein. The sequences of the amino acids that specify the sites of these two cleavages are homologous to those found in the precursors of other members of the papain family as well.

Comparison of the silicatein α and Cathepsin L sequences [Shimuzu et al. (1998), supra] also reveals that the six cysteine residues that form intramolecular disulfides in Cathepsin L are fully conserved in the silicatein, suggesting that the 3-dimensional structures of the two proteins are quite similar. Two of the three residues (His and Asn) of the "catalytic triad" of the Cathepsin active site also are conserved in silicatein α, but the third active-site residue in Cathepsin, Cys, is replaced in the silicatein by $Ser_{26}$, preventing this protein from being an effective protease [Shimuzu et al. (1998), supra]. At this position, the structure of silicatein α resembles that of the other major class of proteases, the serine proteases, typified by trypsin and chymotrypsin. Recent site-directed mutagenesis results confirm the requirement for the specific $serine_{26}$ and $histidine_{165}$ residues of silicatein α for catalysis of the siloxane polymerization described here [Morse, D. E. (1999), supra; and Zhou, Y., Shimizu, K., Cha, J. N., Stucky, G. D., and Morse, D. E. (1999) *Ang. Chemie, Intl. Ed.* 38, 779-782, incorporated herein by reference in its entirety]. Accordingly, preferred versions of the present invention will utilize silicatein subunit α, which contains $serine_{26}$ and $histidine_{165}$ residues, as the catalyst.

Hecky et al. postulated that the hydroxyl-rich proteins of the silicified diatom wall might condense with silicic acid monomers, thus serving as a template to organize the growth of the silica [Hecky et al (1973), supra]. Thermodynamic calculations have been presented in support of that suggestion [Lobel et al. (1996), supra]. Such a mechanism may also contribute to the results reported here. While the lack of activity of the hydroxyl-rich cellulose and silk polymers indicates that the simple density of hydroxyls is not alone sufficient for polymerization of the silicon alkoxides, the conformation of such groups in the silicatein molecule may be important for the template-like scaffolding activity. Indeed, several runs of contiguous hydroxyls are found in silicatein α [Shimuzu et al. (1998), supra], which might be important in orienting the siloxane groups of either the substrate or product.

Mechanism of Action: Homology of silicatein a to the well-known enzyme, Cathepsin L, points to a possible reaction mechanism that is supported by recent site-directed mutagenesis experiments. The condensation of silicon alkoxides promoted by the silicateins and the cleavage of peptides catalyzed by the proteases both must proceed through an obligatory hydrolysis reaction, and both are known to be accelerated by general acid-base catalysis, suggesting that the mechanism of action of silicatein α in this process may be fundamentally related to that of its homologous enzyme counterparts. The requirement for the specific serine$_{26}$ and histidine$_{165}$ residues of silicatein α for catalysis of the siloxane polymerization suggests that the mechanism of silicatein-mediated catalysis of siloxane polymerization from the alkoxide substrates may be closely parallel to that of the well characterized Ser-His and Cys-His active site proteases [Lehninger, A., Nelson, D., & Cox, M. eds. (1993) in *Principles of Biochemistry* (Worth Publishers, New York), pp. 223-227].

Figure 3:
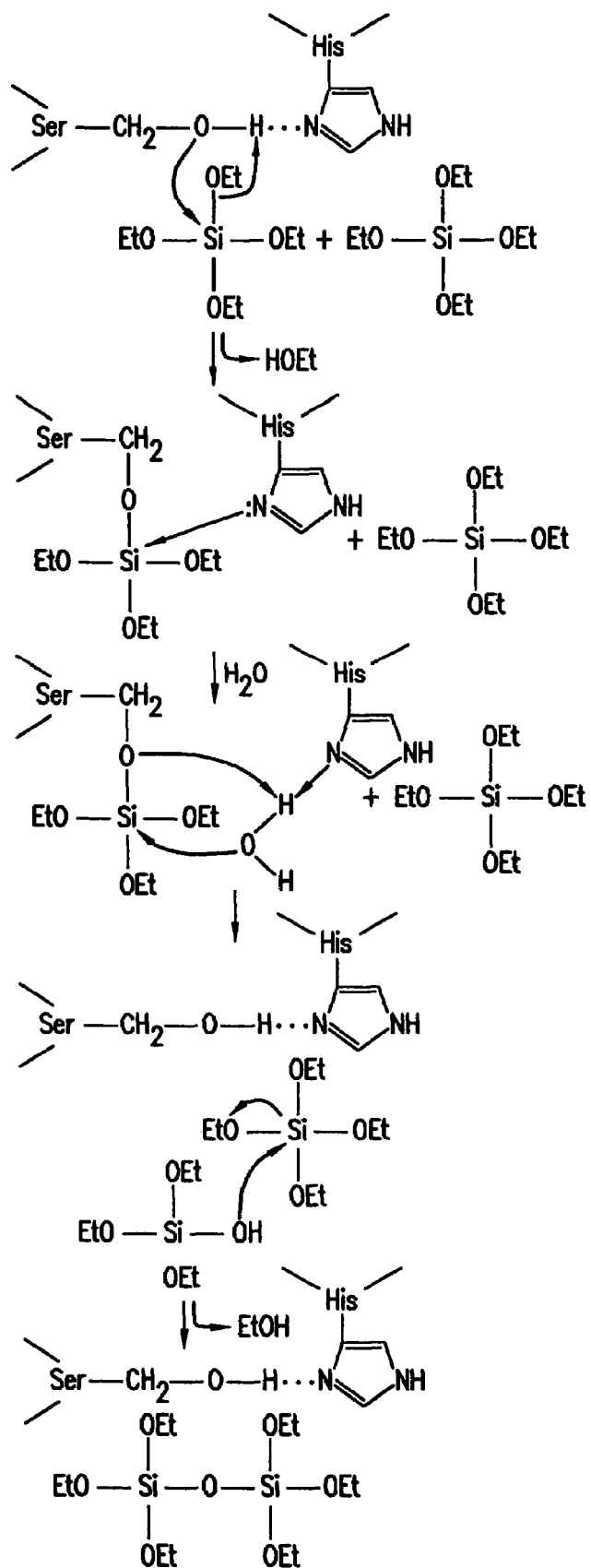
FIG. 3 shows a proposed reaction mechanism of silicon ethoxide condensation.

FIG. 3 shows a proposed reaction mechanism of Silicon ethoxide condensation catalyzed by silicatein α is based on the well-characterized mechanism of catalysis by the serine-histidine and cysteine-histidine active-site proteases [Morse, D. E. (1999) in *Organosilicon Chemistry IV: from Molecules to Materials,* eds. Auner, N. and Weis, J. (Wiley-VCH, New York), 1999; pp. 5-16; incorporated herein by reference]. As stated therein, "Our final objective is then to use the information obtained from the studies of the mutationally altered proteins to design synthetic peptide based catalysts to test the validity of our conclusions, and to guide the design of synthetic non-catalysts and structure-directing scaffolds that are both less expensivepeptide-based and more robust than the natural and genetically engineered proteins." R is phenyl- or methyl- for the silicontriethoxide substrates, and R=CH$_3$CH$_2$—O—(=EtO—) for TEOS. Hydrogen-bonding between the imidazole nitrogen of the conserved histidine and the hydroxyl of the active-site serine is proposed to increase the nucleophilicity of the serine oxygen, potentiating its attack on the silicon atom of the substrate; nucleophilic attack on the Si displaces ethanol, forming a covalent protein-O—Si intermediate (potentially stabilized as the pentavalent Si adduct via donor bond formation with the irnidazole; addition of water completes hydrolysis of the first alkoxide bond; condensation initiated by nucleophilic attack of the released Si—O on the silicon of the second substrate molecule then forms the disiloxane product.

FIG. 3 illustrates such a mechanism, whereby the silicatein actually functions as a hydrolase with these substrates, converting the silicon alkoxides to their corresponding silanols, which are known to condense rapidly and spontaneously to form polysiloxanes. Silicatein α catalyzes silicon ethoxide condensation by the well-characterized mechanism of catalysis by the serine-histidine and cysteine-histidine active-site proteases [Morse, D. E. (1999) in *Organosilicon Chemistry IV: from Molecules to Materials,* eds. Auner, N. and Weis, J. (Wiley-VCH, New York), 1999; pp. 5 -16; incorporated herein by reference]. As stated therein, "Our final objective is then to use the information obtained from the studies of the mutationally altered proteins to design synthetic peptide based catalysts to test the validity of our conclusions, and to guide the design of synthetic non-peptide-based catalysts and structure-directing scaffolds that are both less expensive and more robust than the natural and genetically engineered proteins." R is phenyl- or methyl- for the silicontriethoxide substrates, and R=CH$_3$CH$_2$—O— (=EtO—) for TEOS. Hydrogen-bonding between the imidazole nitrogen of the conserved histidine and the hydroxyl of the active-site serine is proposed to increase the nucleophilicity of the serine oxygen, potentiating its attack on the silicon atom of the substrate; nucleophilic attack on the Si displaces ethanol, forming a covalent protein-O—Si intermediate (potentially stabilized as the pentavalent Si adduct via donor bond formation with the irnidazole; addition of water completes hydrolysis of the first alkoxide bond; condensation initiated by nucleophilic attack of the released Si—O on the silicon of the second substrate molecule then forms the disiloxane product. This mechanism may help explain the observed acceleration of silicon alkoxide condensation promoted by silicatein a and the silicatein filaments in vitro, since is known that the rate-limiting step in this condensation is the initial hydrolysis of the alkoxide required to generate the reactive Si—O species, and that the rate of spontaneous hydrolysis is lowest at neutral pH [Iler, R. K. (1979) in *The Chemistry of Silica: Solubility, Polymerization, Colloid and Surface Properties, and Biochemistry* (John Wiley & Sons, New York), pp. 98-99].

Methods of Makinq Silicateins; The preparation of wild type, mutant, native, recombinant and synthetic silicateins will be straightforward to those of skill in the art in light of the present disclosure. Native silicatein filaments and subunits can be prepared as described in greater detail Shimuzu et al. (1998), supra, and in the Example 1 below. Alternatively, a recombinant silicatein can be prepared by expressing the silicatein encoding segments of a silicatein gene (see, e.g., SEQ ID NO:2), including wild type and mutant genes, in a recombinant host cell and collecting the expressed protein. The host cells can be bacterial, yeast, insect, mammalian or other transformed animal cells. The coding segments can be in the form of naked DNA, or housed within any one of a variety of expression vectors, such as recombinant plasmids or viruses, which have been modified to contain and express the encoded silicatein protein. More particularly, recombinant silicatein subunit α can be expressed as a fusion protein as described in Zhou et al. (1999), supra.

Synthetic silicatein peptides can be made using automated methods for peptide synthesis. Techniques for the operation of automated peptide synthesizers is standard practice in the art and such services may be obtained commercially, as described further in a subsequent example.

Synthetic polypeptide catalysts: Synthetic polypeptides, more particularly, cysteine-lysine block copolypeptides unexpectedly mimic the properties of silicatein. These synthetic copolymers emulate silicatein by self-assembling into superstructures that can hydrolyze silicon alkoxides, while simultaneously directing the formation of the silica into ordered morphologies.

Since TEOS is stable when mixed with water at neutral pH, successful biomimetic silica synthesis from this precursor requires an agent that displays hydrolytic activity simultaneously with structure-directing properties. Site-directed mutagenesis of the cloned DNA coding for silicatein α revealed that interacting histidine and serine residues were required for the hydrolytic activity of this protein. For this reason, simple homopolypeptides of amino acids bearing polar functional groups were evaluated for their ability to mimic the properties of silicatein in the polycondensation of silicon alkoxides. However, homopolymers of L-lysine, L-histidine, D/L-serine, L-threonine, and L-glutamic acid failed to catalyze TEOS hydrolysis and condensation. In contrast, oligomers of L-cysteine efficiently produce silica from TEOS in pH 7 buffer (see Table 2 in Example II, below), when handled under an inert nitrogen atmosphere to prevent oxidation. Accordingly, preferred synthetic polypeptide catalysts include one or more nucleophilic sulfhydryl groups, which can initiate hydrolysis of the silicon alkoxide. Preferred L-cysteine homopolymers are less than about 3000 Da, since higher chain lengths are insoluble. Moreover, when these oligomers are used under air, oxidation of the sulfhydryl groups to disulfides results in insoluble aggregates that are much less active in silica formation.

Diblock copolypeptides that contain covalently linked domains (blocks) of water soluble and insoluble polypeptides are better able to mimic the catalytic activity of a silicatein. Dissimilarity in the block segments provides the chains with an amphiphilic character, similar to that of surfactants, which results in self-assembly of the chains in aqueous solution. The architecture and design of the block copolypeptides also provide simple means to solubilize water-insoluble domains, e.g. hydrolytically active poly-L-cysteine. Such block copolypeptides allow the directed cooperative assembly, hydrolysis, and condensation of TEOS to form specific silica structures.

Preferably, the solubilizing block copolypeptide components are cationic polyelectrolytes, such as poly-L-lysine, which are known to be water soluble at pH 7. As water insoluble domains, poly-L-cysteine and poly-L-serine are preferred, both for their potential silica-forming hydrolytic activity as well as their ability to aggregate in water by either hydrogen or covalent bonding via β-sheet formation or disulfide linkages. Other less preferred insoluble domains include polar residues that are less nucleophilic than cysteine (poly-L-glutamine and poly-L-tyrosine) or slightly hydrophobic (poly-L-alanine).

Figure 4:
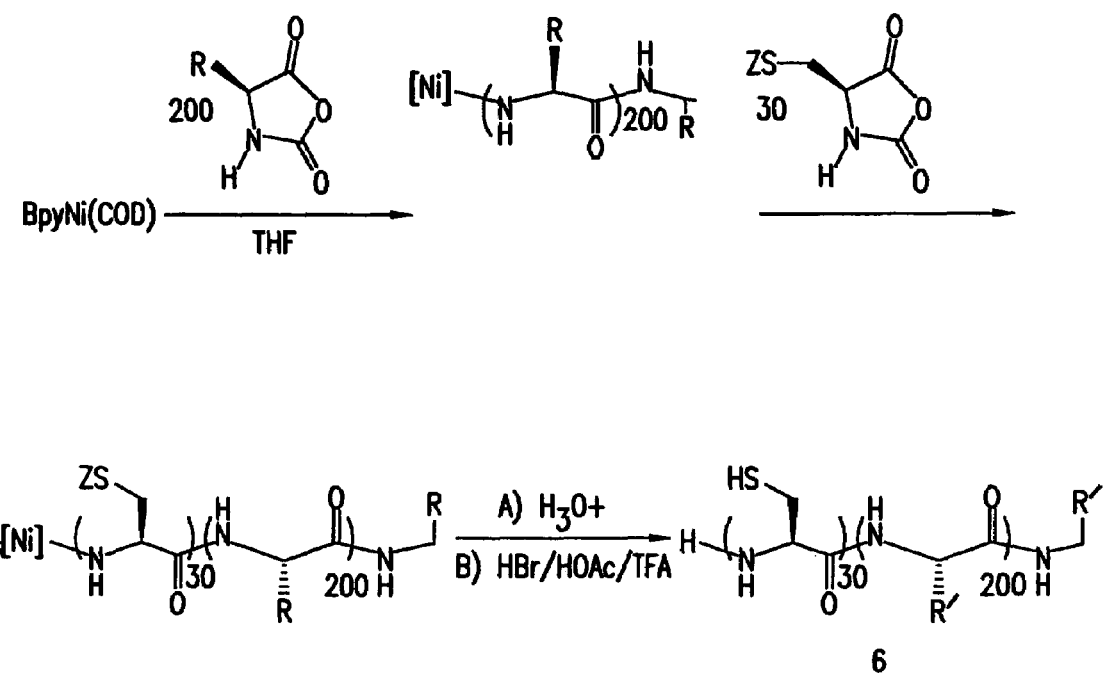
FIG. 4 shows the stepwise polymerization of monomers, $N_\epsilon$-carboxybenzyl-L-lysine NCA followed by S-carboxybenzyl-L-cysteine NCA, followed by deprotection.

The block copolypeptides that were synthesized and studied are given in Table 2 (see Example II, below). They were prepared from suitably protected amino acid-N-carboxyanhydride (NCA) monomers by using the initiator 2,2'-bipyridylNi(1,5-cyclooctadiene). This synthetic protocol has been shown to give block copolypeptides of narrow molecular weight distributions and with controlled molecular weights. FIG. 4 shows that the stepwise polymerization of monomers, $N_\epsilon$-carboxybenzyl-L-lysine NCA followed by S-carboxybenzyl-L-cysteine NCA gave the protected polymer that was then deprotected using equimolar amounts of trifluoroacetic acid and 33% HBr in acetic acid to give 6. BpyNi(COD)=2,2'-bipyridylnickel(1,5-cyclooctadiene).

The protected copolymer was analyzed using size-exclusion chromatography in DMF at 60° C. to verify the molecular weight. Polymer composition was verified by $^1$H NMR analysis of the deprotected copolymer in TFA-d. However poly-L-histidine was not used in these studies because of difficulty in protecting the side-chain to form a suitable NCA monomer.

Cationic block copolymers, showed more activity in silica formation than the corresponding anionic copolymer. In fact, poly-L-glutamate completely inhibited the ability of the poly-cysteine block to form silica, which supports the hypothesis that polycations are important for interacting with negatively charged silicate precursors. All of the lysine containing copolymers display some activity in silica formation, and the rate of silica production increased steadily as the domain bound to the poly-L-lysine block became more nucleophilic. Since polymer 1, which contains no nucleophilic component, was able to produce silica, it appears that poly-L-lysine itself, when constrained in a self-assembling block copolymer, possesses a low activity toward the hydrolysis and condensation of TEOS. However, cysteine and lysine containing copolymers are the only ones tested thus far that are able to control the shape of the silica during its formation, with the cysteine-containing polymers being most active. Accordingly, the synthetic cysteine-lysine diblock combination is most preferred.

Small Molecule Non-Polmeric Biomimetic Catalysts

Small molecule non-polymeric biomimetic catalysts usable in this invention have a nucleophilic functionality and a hydrogen-bonding acceptor group enabling them to assemble, hydrolyze, and condense the substrate reactant at about neutral pH and at ambient temperature. The catalyst comprises a compound having a nucleophilic functionality (such as, but not confined to —SH, —OH, etc.) and a hydrogen-bonding acceptor group (such as, but not confined to —NH, —NH$_2$, etc.), and is exemplified by such structures as cysteamine, hydroxylamine, ethanolamine, hydroxyalkylamines, and mercaptoalkylamines. The catalysts mimic the in vivo activity of proteins that control silicification in marine organisms.

For the sake of completion, applicant will set forth specific implementation details, including examples, relevant to parent application Ser. No. 09/856,599. This will be followed by specific implementation details, including examples, relevant to aspects of the invention that supplement the invention of Ser. No. 09/856,599 and amplify on broader aspects of the invention Compositions and Methods of Use Relevant to Ser. No. 09/856,599

The invention described in parent application Ser. No. 09/856,599 provides methods for in vitro polymerization of silica and silicone polymer networks. The first step of the method is to combine a catalyst and a substrate. Accordingly, compositions for use in the polymerization method include a substrate and a catalyst that have been described in further detail supra, which assembles, hydrolyzes, and condenses the substrate at about neutral pH. Preferably, the substrate is a silicon alkoxide, such as silicon tetraethoxide and organically modified silicon triethoxides. More preferably, the substrates are of the general formula R—Si—(O-Et)$_3$, wherein Et is ethyl and R is methyl, phenyl, or ethoxy. These substrates are preferred because of their stability at neutral pH, and the similarity of their chemical reactivity to that of the substrates of proteases.

Figure 1A:
Figure 1B:
Figure 1C:
Figure 1D:
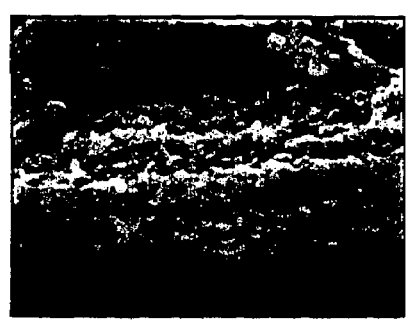
Figure 1E:
Figure 1F:

The next step of the method is to polymerize the substrate to form silica, polysiloxanes, polymetalloid-oxanes polymetallo-oxanes (metal oxides), polyorganometalloid oxanes, polyorganometallo oxanes, and the polyhydrido derivatives thereof, at about neutral pH. When organically substituted silicon trioxides are provided as substrates, the silicateins catalyze their condensation to form the corresponding polysilsesquioxanes $(RSiO_{3/2})_n$, wherein n is an integer greater than 1 and R is an alkyl or phenyl group. For example, reaction of the macroscopic silicatein filaments with phenyl- or methyl-triethyloxysilane promotes rapid polymerization with scaffolding of the resulting silsesquioxane polymer network on the silicatein filament (See FIG. 1C). The in vitro synthesis of silicas and silsesquioxanes by the catalysts of the present invention at neutral pH illustrates how this mechanism may be harnessed for the development of environmentally benign new routes to the synthesis of patterned silicon-based materials.

Moreover, the shapes of the silicon containing polymers produced by the method of the present invention can be varied, depending on the catalyst. For example, when macroscopic silicatein filaments are used as catalysts, the silica or silsesquioxanes product is formed over the surface of the filament, following the contours of the underlying macromolecular topology (See, e.g., FIGS. 1A, 1B). Thus, the silicatein filaments exhibit both "scaffolding" (macroscopic structure-directing) and catalytic activities in directing the condensation of the alkoxides to form polysiloxanes in vitro.

The synthesis of polymeric networks of phenyl- and methyl-silsesquioxanes coating the surface of the silicatein filaments at neutral pH in vitro shows that this mechanism may be utilized for shaping silicon-based materials. However, silica formed by using oligo-L-cysteine is an amorphous powder with no defined macroscopic shape. Thus, simple homopolymers of amino acids, which lack the structural complexity and polyfunctionality found in proteins, are unable to reproduce the shape-controlling ability of silicatein. Surprisingly, block copolypeptides of cysteine and lysine can be used to mimic biological silica synthesis, wherein hydrolysis and condensation of an inorganic phase as well as structural templating are all controlled by a single synthetic material at pH 7. Since assembly of cysteine containing block copolypeptides is influenced by oxidation of the cysteine sulfhydryl groups, different silica structures can be produced from a single copolymer exposed to different oxidizing conditions. For example, transparent, hard silica spheres or elongated globules are formed by using the fully reduced cysteine-lysine copolymers, while oxidation of the same cysteine-lysine copolymer leads to formation of well-defined columns of amorphous silica.

EXAMPLE 1

In this Example, silicatein filaments and subunits from a marine sponge direct the polymerization of silica and silicones in vitro.

Materials and Methods

Isolation of Silicatein Filaments and Analysis of Reactions with Silicon Alkoxides. Insoluble silicatein filaments were extracted from the acid- and hypochlorite-cleaned silica spicules of *Tethya aurantia* by dissolving the silica in buffered HF (1M HF, 5M $NH_4F$) as described previously [Shimuzu et al. (1998), supra]. The HF was removed by dialysis against pure water (Milli-Q) and the filaments collected by filtration. Reactions of the insoluble filaments [either air-dried or suspended (at 0.5 mg/ml) in Tris-HCl buffer (0.6 ml, 25 mM, pH 6.8)] with TEOS (1.0 ml; 4.5 mmoles) were performed with gentle shaking at room temperature for 12 h. The silicatein filaments were added in aqueous Tris buffer for all reactions except that illustrated in FIG. 1C, in which the air-dried filaments were reacted with pure TEOS. The reaction also was performed with phenyl-triethoxysilane (FIG. 1D) in place of TEOS, using 1.0 ml (4.1 mmoles) of phenyltriethoxysilane. For all samples the insoluble materials were collected by centrifugation, air-dried, gold sputter-coated and imaged by scanning electron microscopy with a JEOL JSM 6300F equipped with a cold cathode field-emission source operated at a beam energy of 3.5 kV (FIG. 1).

NMR Analyses. NMR spectra were acquired on a CMX-500 Chemagnetics spectrometer operating at 11.7 Tesla and a $^{29}Si$ frequency of 99.06 MHZ referenced to TMS [Smaihi, M., Jermourni, T., & Marignan, J. (1995) *Chem. Mater.* 7, 2293-2299]. The single-pulse spectrum was acquired for 22 h with an 8.35 μs single pulse and a recycle delay of 300 s while spinning at 3.5 kHz. Cross-polarization MAS spectra were acquired for 4 h with a contact time of 4 ms, a pulse width of 6 μs, and a recycle delay of 2 s while spinning at 6 kHz.

Silicatein Subunits, and Analysis of Reactions with Silicon Alkoxides Silicatein subunits (Table 1A) were solubilized from the purified filaments [Shimuzu et al. (1998), supra] by treatment with 10 mM NaOH for 5 min, and the soluble subunits then dialyzed extensively at 4° C. against Tris-HCl buffer (25 mM pH 6.8). Silicatein α (Table 1 B) was expressed from a recombinant DNA template in *E. coli*, purified and reconstituted by standard procedures [Zhou et al. (1999), supra] and dialyzed as above. Denatured proteins were boiled for 15 min. The proteins then were utilized immediately for the following assay: TEOS (1 ml; 4.5 mmoles) was added to 0.6 ml protein (0.26 or 0.5 mg/ml in Tris buffer as specified). The mixtures were thoroughly resuspended by pipetting and the reactions allowed to continue for 15-60 min at 20° C. The samples then were centrifuged to collect the silica products; the pellets were washed a minimum of 3 times with ethanol to remove unreacted TEOS, collected by centrifugation and then either hydrolyzed with 1 M NaOH for 10 min or suspended only with water to quantify residual adsorbed TEOS. The samples then were diluted and the released silicic acid quantified using a modification of the colorimetric molybdate assay [Strickland, J. D. H. & Parsons, T. R. (1972) in *A Practical Handbook of Seawater Analysis* (2nd ed.) Fish. Res. Bd. Can. Bull.] with the reagent blank of Brzezinski & Nelson [Brzezinski, M. A. & Nelson, D. M. (1986) *Mar. Chem.* 19, 139-151] yielding a detection limit of 50 nM $Si(OH)_4$.\

TABLE 1

Silicatein subunits catalyze polymerization of silica

| Protein | Polymerized Si (mmoles) |
|---|---|
| A. | |
| Silicatein subunits | |
| Native | 214.0 + 2.0 |
| Denatured | 24.5 + 2.0 |
| Bovine serum albumin | 42.1 + 0.7 |
| Papain | 22.9 + 1.0 |
| Trypsin | 16.2 + 2.6 |
| (None) | 10.2 + .1.3 |
| B. | |
| Recombinant silicatein α | |
| Native | 140.0 + 6.2 |
| Denatured | 8.8 + 1.9 |
| (None) | 6.7 + 2.1 |

Proteins in 0.6 ml Tris-HCl buffer (25 mM, pH 6.8) were incubated with 1 ml (4.5 mmoles) TEOS and the polymerized silica quantitated after centrifugation and hydrolysis as described in Materials and Methods. (A) Proteins at 0.3 mg; reaction for 15 min; (B) protein at 0.06 mg; reaction for 60 min.

Results

The silicatein filaments can be dissociated to their constituent subunits, α, β, and γ [Shimuzu et al. (1998), supra]. These subunits accelerate the in vitro polymerization of silica $(SiO2)_n$ from the monomeric TEOS at neutral pH (Table 1A). Electron microscopy confirms the formation of a dendritic silica precipitate (not shown). Little polymerization is seen in the absence of these proteins; it is known that under these conditions, polymerization of silica from TEOS normally requires either an acid or base catalyst. The activity of the silicatein subunits is abolished by thermal denaturation, demonstrating a dependence on the native 3-dimensional conformation of the subunit proteins. Denaturation with the detergent, SDS (sodium dodecyl sulfate), also abolishes activity (results not shown). Specificity of the observed effect is indicated by the finding that the condensation of TEOS under these conditions is significantly slower when trypsin, papain, or bovine serum albumin are substituted for the silicatein.

Silicatein α comprises ca. 70% of the mass of the silicatein filaments in *Tethya aurantia* [Shimuzu et al. (1998), supra]. This subunit, when expressed in bacteria from a recombinant DNA template and subsequently purified and reconstituted, proves to be sufficient to accelerate the polymerization of silica from TEOS at neutral pH (Table 1B). In this case also, thermal denaturation abolishes reactivity with the silicon alkoxide. These findings are significant because the complete amino acid sequence of the α subunit reveals a high similarity to members of a well-characterized enzyme superfamily [Shimuzu et al. (1998), supra].

Figure 2:
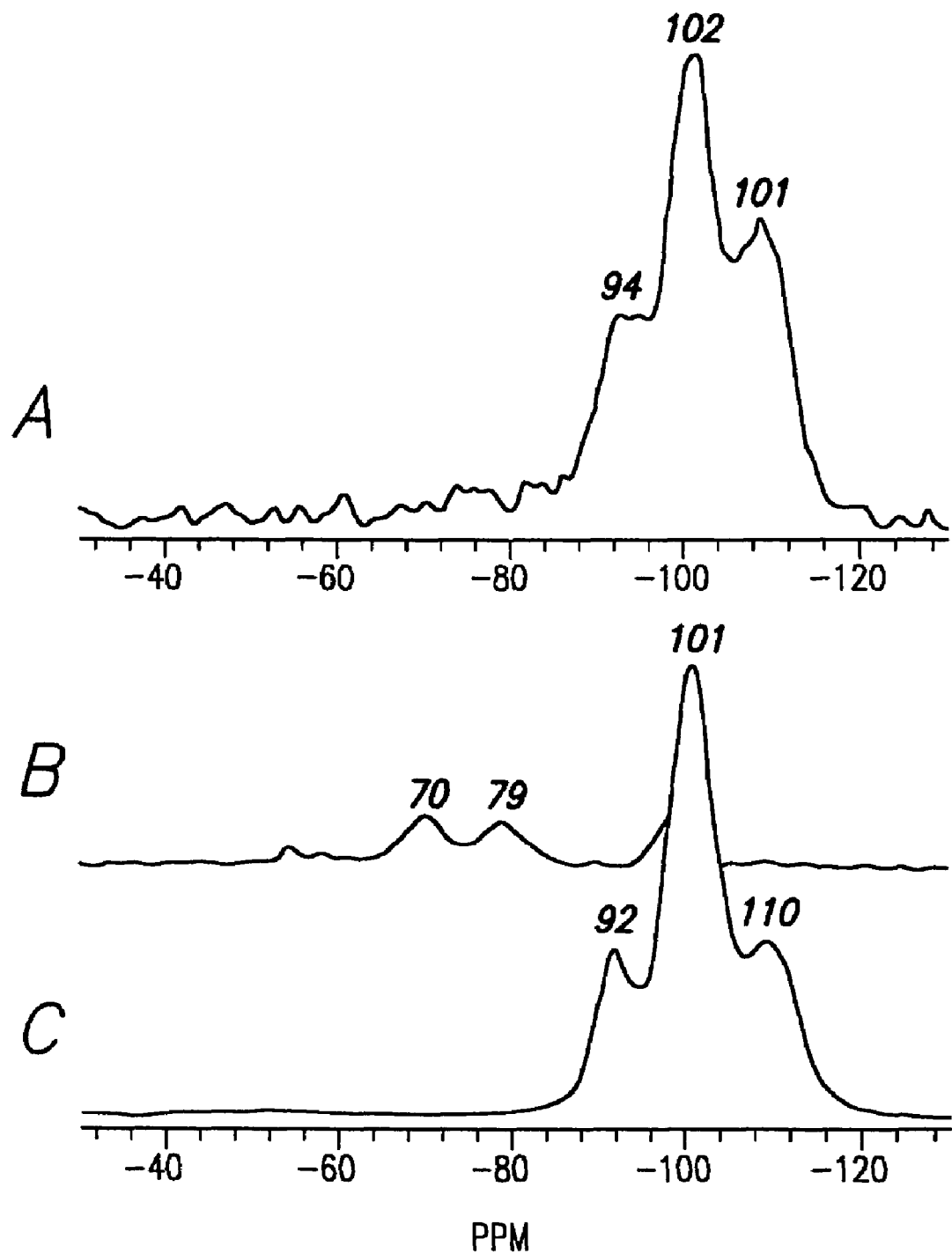

The intact silicatein filaments also are active, promoting the condensation of silicon alkoxides and organically modified silicon alkoxides to form the corresponding polymerized silica or silsesquioxanes $(RSiO_{3/2})_n$ (silicones in which R=an organic side chain) at neutral pH (FIGS. 1 and 2). The macroscopic filaments serve as scaffolds to organize the deposition of the resulting silica and silsesquioxanes (FIG. 1). Organization of the resulting silica is more clearly seen when the condensation of TEOS is performed in the absence of added water (other than the water of protein hydration), restricting the dendritic growth of the silica by limiting hydrolysis of the precursor to create a silica substructure that follows the longitudinal axis of the protein filament (FIG. 1C). In the absence of the filaments, no polymerization of TEOS was observed at neutral pH during the course of the experiments, consistent with the known requirement for acid or base catalysis. The activity of the silicatein filaments is abolished by thermal denaturation, indicating a dependence on the native conformation of the constituent proteins. Neither silk (not shown) nor cellulose (FIG. 1E, F) fibers exhibit any activity with TEOS under the same conditions, demonstrating that polymeric fibers with high surface densities of hydroxyl groups are not sufficient to accelerate or organize silica polymerization from TEOS at neutral pH. The acceleration of polymerization and structure-directing activities of the silicatein filaments also are evident with organically substituted triethoxysilane precursors with the general structure R—Si—(OEt)$_3$, where R=phenyl, methyl, etc. When phenyltriethoxysilane is provided as substrate, a polymerized product is formed on the protein filaments (FIG. 1D), while under the same conditions (pH 6.8, 24 h) in the absence of the protein filaments little or no condensation of the precursor was observed. Similar results were observed with methyltriethoxysilane as well.

The synthesis of polymeric networks of phenyl- and methyl-silsesquioxanes by the silicatein filaments at neutral pH in vitro suggests that this mechanism may be harnessed for the development of environmentally benign new routes to the synthesis of patterned silicon-based materials. Solid-state $^{29}Si$ NMR was used to analyze the extent of polymerization of the siloxanes on the protein filaments. Analysis of the product formed from TEOS (FIG. 2A, C) revealed three inhomogeneously broadened peaks corresponding to $Q^2$ (−90 ppm), $Q^3$ (−100 ppm) and $Q^4$ (−110 ppm) siloxane species, indicative of a disordered, incompletely polymerized opal-like silica network characteristic of the silica found in biological materials. In contrast to these results, cross-polarization $^{29}Si$ NMR analysis of the product formed from the phenyltriethoxysilane precursor revealed no $Q^4$ species (FIG. 2B). This result is consistent with the silsesquioxane structure of the polymerized product, as would be predicted from polumerization of the percursor which contains only three functional groups available for the formation of siloxane linkages. The phenylsilsesquioxane exhibits a $T^3$ resonance at −79 ppm (shifted downfield by 20 ppm due to the phenyl substituent) [Smaihi et. al. (1995), supra] and possible $T^2$ and $T^1$ resonances.

EXAMPLE 2

This example demonstrates the block copolypeptide mediated biomimetic synthesis of ordered silica structures.

Block copolypeptides were screened for their ability to react with TEOS to form silica. Refering to Table 2 (below): Yield=total isolated yield of deprotected copolymer. $SiO_2$ Rate=initial rate of silica formation (μmoles/h) mediated by block copolypeptide at a concentration of 5 mg/ml in 50 mM Tris-HCl buffer, pH 6.8 and an initial TEOS concentration of 3.4 M. The silica precipitate was collected by centrifugation, washed with 95% ethanol and solubilized in 0.2 M NaOH at 37° C. The amount of silica was then determined using the spectrophotometric molybdate assay (24, 25) $N_2$=silica preparation was carried out under an oxygen-free nitrogen atmosphere; Air=silica preparation was carried out in air. In the absence of polymer, one was used as the control. Shape=morphology of silica particles: N=non-ordered; S=spheres; E=elongated globules; C=columns. NA=not applicable.

TABLE 2

| Entry | Composition | Yield (%) | SiO$_2$ N$_2$ | SiO$_2$ Air | Shape N$_2$ | Shape Air |
|---|---|---|---|---|---|---|
| 1 | Poly(L-Alanine 30-b-L- | 87 | 9.09(2) | NA | N | NA |
| 2 | Poly (L-Glutamine$_{30}$-b-L- | 88 | 9.22(7) | NA | N | BA |
| 3 | Poly (L-Serine$_{30}$-b-L-Lysine$_{200}$) | 84 | 0.29(3) | NA | N | NA |
| 4 | Poly(L-Tyrosine$_{30}$-b-L-Lysine$_{200}$) | 86 | 0.30(7) | NA | N | NA |
| 5 | Poly(L-Cysteine$_{10}$-b-L-Lysine$_{200}$) | 76 | 0.60(2) | 0.60(2) | S | S |
| 6 | Poly(L-Cysteine$_{30}$-b-L-Lysine$_{200}$) | 77 | 0.43(2) | 0.62(4) | S | C |
| 7 | Poly(L-Cysteine$_{60}$-b-L-Lysine$_{200}$) | 87 | 0.37(4) | 0.67(1) | E | C |
| 8 | Poly(L-Cysteine$_{30}$-b-L-Lysine$_{400}$) | 88 | 0.62(4) | 0.65(4) | S | S |
| 9 | Poly(L-Cysteine$_{30}$-b-L- | 90 | 0.01(1) | 0.01(1) | NA | NA |
| 10 | Poly(L-Cysteine$_{30}$) | 76 | 0.43(6) | 0.08(1) | N | N |
| 11 | Poly(L-Lysine$_{200}$) | 96 | 0.01(1) | NA | NA | NA |
| 12 | None | NA | 0.01(1) | NA | NA | NA |

Since TEOS is stable when mixed with water at neutral pH, a successful biomimetic silica synthesis for this precursor requires an agent that displays hydrolytic activity simultaneously with structure-directing properties. Site-directed mutagenesis of the cloned DNA coding for silicatein a revealed that interacting histidine and serine residues were required for the hydrolytic activity of this protein. Based on this precedent, simple homopolyamides of amino acids bearing polar functional groups were evaluated for their ability to mimic the properties of silicatein in the polycondensation of silicon alkoxides. When the homopolymers of L-lysine, L-histidine, D/L-serine, L-threonine, and L-glutamic acid were separately dissolved in aqueous pH 7 buffer and mixed with TEOS, it was found that none of these polymers was able to produce silica at ambient temperature over a 24 hour period. Furthermore, mixtures of these homopolymers also failed to catalyze TEOS hydrolysis and condensation. In contrast, we found that oligomers of L-cysteine (ca. 3000 Da, used since higher chain lengths were insoluble) efficiently produce silica from TEOS in pH 7 buffer (Table 2), when handled under an inert nitrogen atmosphere to prevent oxidation. This result was presumably due to the nucleophilicity of the sulfhydryl group, which may enable it to initiate hydrolysis of the silicon alkoxide. When these oligomers were used under air, oxidation of the sulfhydryl groups to disulfides resulted in insoluble aggregates that were much less active in silica formation (Table 2). However, the silica formed by using oligo-L-cysteine was an amorphous powder with no defined macroscopic shape. From these results we concluded that simple homopolymers of amino acids, which lack the structural complexity and polyfunctionality found in proteins, are unable to reproduce the shape-controlling ability of silicatein.

In an effort to better mimic this protein, we synthesized diblock copolypeptides that contained covalently linked domains (blocks) of water soluble and insoluble polypeptides. Dissimilarity in the block segments imparted the chains with an amphiphilic character, similar to that of surfactants, which resulted in self-assembly of the chains in aqueous solution. The architecture and design of the block copolypeptides also provided a means to solubilize water-insoluble domains, e.g. hydrolytically active poly-L-cysteine. For these reasons, block copolypeptides were expected to allow the directed cooperative assembly, hydrolysis, and condensation of TEOS to form specific silica structures. The solubilizing block copolypeptide components were either cationic or anionic polyelectrolytes, such as poly-L-lysine and poly-L glutamate, which are known to be water soluble at pH 7. As water insoluble domains, poly-L-cysteine and poly-L-serine were chosen both for their potential silica-forming hydrolytic activity as well as their ability to aggregate in, water by either hydrogen or covalent bonding via β-sheet formation or disulfide linkages. Other insoluble domains chosen included polar residues that were less nucleophilic than cysteine (poly-L-glutamine and poly-L-tyrosine) or slightly hydrophobic (poly-L-alanine). Poly-L-histidine was not used in these studies because of difficulty in protecting the side-chain to form a suitable NCA monomer. The block copolypeptides that were synthesized and studied are given in Table 2. They were prepared from suitably protected amino acid-N-carboxyanhydride (NCA) monomers by using the initiator 2,2'-bipyridylNi(1,5-cyclooctadiene). This synthetic protocol has been shown to give block copolypeptides of narrow molecular weight distributions and with controlled molecular weights (FIG. 4) [Deming, T. J. (1997) *Nature* 390, 386-389].

The cationic block copolymers, showed more activity in silica formation than the corresponding anionic copolymer. In fact, poly-L-glutamate completely inhibited the ability of the poly-cysteine block to form silica, which supports the hypothesis that polycations are important for interacting with negatively charged silicate precursors. All of the lysine containing copolymers displayed some activity in silica formation, and the rate of silica production increased steadily as the domain bound to the poly-L-lysine block became more nucleophilic. Since polymer 1, which contains no nucleophilic component, was able to produce silica, it appeared that poly-L-lysine itself, when constrained in a self-assembling block copolymer, possessed a low activity toward the hydrolysis and condensation of TEOS. However, the cysteine and serine containing copolymers were the only ones that were able to control the shape of the silica during its formation, with the cysteine-containing polymers being most active. For these reasons, further studies were focused on the cysteine-lysine block copolymer combination.

Figure 5A:
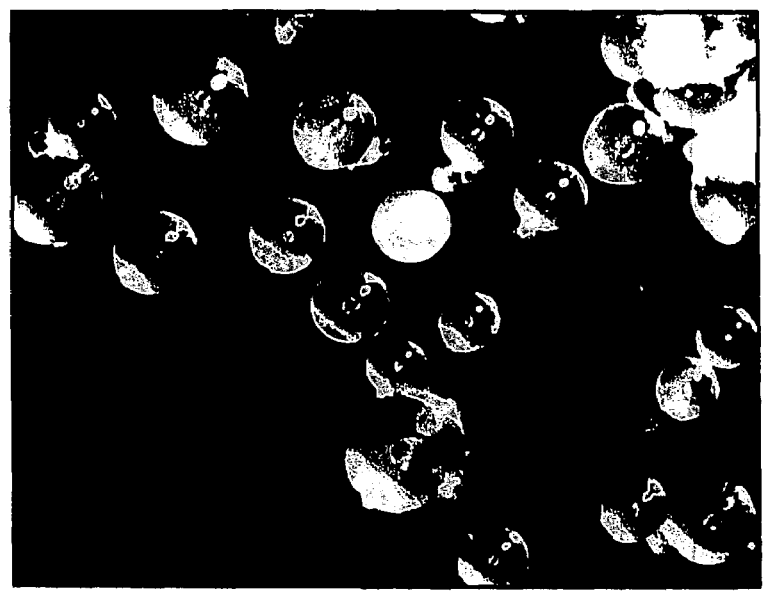
FIG. 5 shows different ordered silica shapes obtained using a block copolypeptide.
Figure 5B:

FIG. 5 shows different ordered silica shapes obtained using block copolypeptide 6. In a typical procedure, TEOS (2.0 mL) was added to 500 µL of a solution of 6 (5 mg/mL in 50 mM Tris-HC1 buffer, pH 6.8), and the resulting biphasic mixture was agitated vigorously and then allowed to stand for several hours with no stirring, whereupon some of the TEOS had emulsified into the aqueous phase. After 24 h, the resulting silica precipitate was collected from the aqueous phase, washed with 95% ethanol and air dried. A=optical micrograph of silica spheres obtained from synthesis under nitrogen, bar=200 µm. B=scanning electron micrograph of packed silica columns obtained from synthesis under air, bar=1 µm. The sample was sputter coated with gold and examined with a JEOL JSM 6300F equipped with a cold cathode field-emission source operated at a beam energy of 3.0 kV.

In initial experiments, polymer 6 was deprotected and handled under a nitrogen atmosphere and thus was used in its reduced form when reacted with TEOS. Dynamic light scattering measurements of 6 in aqueous solution (1.6 mg/mL) showed that this polymer self assembled into large aggregates approximately 600 nm in diameter. This colloidal polymer solution, when mixed with TEOS, formed a two-phase system in which some TEOS was emulsified into the aqueous phase. After 24 h, the formation of transparent, composite silica spheres (diameter, ca. 100 pm) was observed, as shown in FIG. 5. $^{29}$Si MAS NMR measurements confirmed the existence of highly condensed silica (35% $Q^3$ and 65% $Q^4$ species). When calcined at 500° C., the spheres remained both intact and transparent without a decrease in apparent size, although TGA analysis revealed a 10% weight loss of organic material. BET nitrogen sorption measurements showed that the spheres were mesoporous; with a broad distribution of pore sizes and a surface area of 436 $m^2/g$ (20). Using the block copolypeptide 6 to prepare these hard, transparent, mesoporous silica spheres represents the first example in which hydrolysis and condensation of an inorganic phase as well as structural templating were all controlled by a single synthetic material at pH 7, thus mimicking biological silica synthesis. To the best of our knowledge, other surfactant or polymer based systems developed for shape-selective silica synthesis typically require use of a catalyst and extreme pH conditions (10,21, 22).

Copolymers similar to 6, but with different block lengths, were also synthesized to determine the role of copolymer composition on silica-forming ability. A polymer with a shorter cysteine domain, 7, was similar to 6 in being able to produce silica spheres. However, when the length of the cysteine domain was increased (8), the formation of more elongated silica particles was observed. Increasing the size of the lysine domain gave a polymer, 9, which behaved in the same way as the smaller, but similar composition, 7. This indicates that the copolymer chainlength has little effect on resulting silica shape. It should be noted that mixtures of L-lysine and L-cysteine homopolymers, in proportions similar to those found in the block copolypeptides 6-9, only gave completely disordered silica powders from TEOS.

An additional feature of the cysteine residues in 6 was their ability to form covalent disulfide bonds as inter- and intra-chain crosslinks upon oxidation of the sulfhydryl groups. After deprotection of the copolymer in air, the formation of such disulfide crosslinks in oxidized 6 was evident from the high viscosity exhibited by this sample upon exposure to water. The gel dissolved readily upon addition of a reducing agent such as β-mercaptoethanol, indicating the presence of disulfide crosslinks. Dynamic light scattering measurements of oxidized solutions of 6 showed that the block copolymer aggregates had increased in size (ca. 1300 nm dia.) relative to unoxidized samples (ca. 600 nm). Surprisingly, when oxidized 6 was mixed with TEOS, the rate of silica formation was found to increase although 70% of the sulfhydryl groups had been converted to disulfide linkages (Table 1). In addition, ordered columns of silica were observed instead of spheres, showing that oxidation of the poly-L-cysteine domains was sufficient to completely modify the resulting topology of the silica (FIG. 2). With copolymers of different composition (Table 2), it could be shown that a minimum fraction of cysteine (ca. 15 mol %) was required to produce the columnar shaped silica composites. These results illustrate the importance of the self-assembled block copolypeptide architecture in the formation of silica shapes. The synthetic capability to directly control silica shape, hydrolysis and condensation rate via adjustment of block copolypeptide composition demonstrated herein presents a new route to the environmentally benign, biomimetic synthesis of inorganic materials.

Compostions and Methods of Use that Supplements Ser. No. 09/856,599

A typical reaction with silicatein in the polymeric multi-enzyme filament form will be described, using a precursor to form nanostructurally directed titanium dioxide, as described in the following examples. Alternatively, other metal, non-silicon metalloid, or rare-earth alkoxide or alkoxide-like precursor, can be used.

EXAMPLE 3

Silicatein filaments (2 mm length×1-2 micrometer diameter) were suspended in water at room temperature and reacted with titanium (IV)bis(ammonium lactato)-dihydroxide (TBALDH), the structure of which is illustrated in FIG. 6. The final molarity of the Titanium alkoxide in the example illustrated was 0.849 M. Biphasic reaction mixtures in which the precursor is added in an organic solvent also are effective. The mixture was rotated to provide gentle agitation in a 1 ml polyethylene comical tube for 24 hours. The reaction product was then harvested by centrifugation in an Eppendorf microcentrifuge at 14,000 rpm for 10 minutes, re-suspended in water and pelleted by centrifugation again for another 10 minutes. The resulting pellets were dried at 37 degrees C. Physical characterization identified the product as Titanium Dioxide that had been formed on the silicatein filaments.

EXAMPLE 4

In contrast to Example 3, as a control, equal parts of 1N sodium hydroxide and aqueous TBALDH were reacted at room temperature. The final molarity of the Titanium alkoxide in the example illustrated was 0.849 M. Biphasic reaction mixtures in which the TBALDH precursor is added in an organic solvent also are effective. The mixture was rotated to provide gentle agitation in a 1 ml polyethylene comical tube for 24 hours. The reaction product was then harvested by centrifugation in an Eppendorf microcentrifuge at 14,000 rpm for 10 minutes, re-suspended in water and pelleted by centrifugation again for another 10 minutes. The resulting pellets were dried at 37 degrees C.

Referring to FIGS. 7A and 7B, samples from the procedures of Examples 3 and 4 were washed three times in deionized water and then mounted on SEM carbon grids, gold sputter coated, and imaged by scanning electron microscopy with a JEOL JSM 6300F. The sample of FIG. 7A was obtained using silicatein filaments as the catalyst in the procedure of Example 3. The sample of FIG. 7B was obtained using NaOH as the catalyst in the procedure of Example 4. It is seen in the electron micrograph of FIG. 7 that the Titanium Dioxide product formed on the silicatein filaments and followed the contours of the silicatein filaments, which served both as a structure-directing template and as a catalyst:

EXAMPLE 5

The procedure of Example 4 was repeated and additional SEM images were obtained. Different regions of the produced material are shown in FIG. 8, which shows 1 and 10 micron scales.

EXAMPLE 6

The procedure of Example 4 was repeated and samples were prepared as described with respect to FIGS. 7A and 7B, except that sputter coating was not performed. A JEOL 6300F scanning electron microscope with an integrated JEOL Energy dispersive spectrometer (EDS) was used. The electron microprobe was coupled to the diffraction x-rays of a range of wavelengths on a gas-flow detector. The spectrum is shown in FIG. 9 wherein C=carbon, O=oxygen, and Ti=titanium. The x-axis is in keV, and the y-axis non-quantitatively signifies relative intensities.

EXAMPLE 7

Samples were prepared as in Example 6. Referring to FIG. 10, the resulting peak shapes of measured spectra were quantified and the quantitative composition of the surface was determined.

EXAMPLE 8

Samples were prepared following the procedure of Example 3 to provide permutations of TBALDH, silicatein filaments, denatured silicatein filaments and their combinations. The silicatein filaments were denatured by heating in water at 95 degrees C. for one hour. FIG. 11 shows the fluorescence of filament/TiO$_2$ combinations or hybrids after excitation at 280 nm, where A is the filament plus TBALDH, B is the denatured filament plus TBALDH, C is the filament alone, D is the denatured filament alone, and E is TBALDH.

EXAMPLE 9

To convert the material to the nitride if desired (e.g., to form Gallium Nitride from the Gallium Oxide or amorphous Gallium Oxane) the GaO product of the catalytic reaction described above is subjected to transamidation with ammonia in a high-pressure cell or pressure bomb.

EXAMPLE 10

Thermal annealing can be used to convert the initially amorphous metallo-oxane or rare-earth oxane to the crystalline material. The following example illustrates thermal annealing to form anatase and/or rutile forms of titanium dioxide. Initial reactions were performed as in Example 3. After washing, samples were dried at 37° C. overnight and ground in an agate mortar to a fine powder. Samples were applied to a heated stage, and the x-ray diffraction pattern was obtained on a Siemens D5005 instrument using Cu Kα radiation. Heating was done in a stepwise manner, in 100° C. increments from ambient temperature to 927° C. FIG. 12 shows the obtained data starting from 227° C.; the ordinate in this figure shows the intensity of X-ray diffraction in arbitrary units.

EXAMPLE 11

Product was formed following the procedure of Example 3 with silicatein protein catalyst. The product was thermally annealed following the procedure of Example 10.

EXAMPLE 12

Product was formed following the procedure of Example 4 except the base catalyst was ammonium hydroxide catalyst. The product was thermally annealed following the procedure of Example 10.

EXAMPLE 13

Product was formed following the procedure of Example 4 with only heat as the catalyst. The product was thermally annealed following the procedure of Example 10.

FIG. 13 is a table showing polymorph and crystal size resulting from the annealing of Examples 11, 12 and 13., respectively with silicatein protein catalyst, sodium hydroxide catalyst, and heat as the catalyst.

Although the present invention and its advantages have been described in detail, it should be understood that various changes, substitutions and alterations can be made herein without departing from the spirit and scope of the invention. Moreover, the scope of the present application is not intended to be limited to the particular embodiments of the process, methods and steps described in the specification. As one of ordinary skill in the art will readily appreciate from the disclosure of the present invention, processes, methods, or steps, presently existing or later to be developed that perform substantially the same function or achieve substantially the same result as the corresponding embodiments described herein may be utilized according to the present invention. Accordingly, the appended claims are intended to include within their scope such processes, methods, or steps.

---

The invention claimed is:

1. A method for forming a non-silicon metalloid-oxane and metallo-oxane, or mixed poly(silicon/metallo)oxane polymer networks, or their hydrido, organic, or organometallic derivatives, comprising condensing an alkoxide substrate with another alkoxide material at neutral or near neutral pH using a catalyst comprising a molecule having a nucleophilic group that displaces alkanol from said alkoxide substrate facilitating solvolysis to initiate structure-directed condensation with said another alkoxide, wherein either or both of said alkoxides is selected from the group consisting of organosilicon alkoxides; hydrido-siicon alkoxides; metallo alkoxides; organometallo-alkoxides; hydrido metallo-alkoxides; metalloid alkoxides; organometalloid alkoxides; and hydrido metalloid alkoxides.

2. The method of claim 1 wherein said structure-directed condensation is by nucleophilic attack.

3. The method of claim 1 wherein said nucleophilic group forms a transitory intermediate in facilitating solvolysis.

4. The method of claim 3 wherein said transitory intermediate is covalent.

5. The method of claim 1 comprising using a group that interacts with said nucleophilic group to increase its nucleophilicity.

6. The method of claim 5 wherein said interaction is by hydrogen bonding.

7. A method for forming a non-silicon metalloid-oxanes, metallo-oxanes, or mixed poly(silicon/metallo)oxane polymer networks, or their hydrido, organic, or organometallic derivatives, comprising condensing a first material with a second material at neutral or near neutral pH using a catalyst comprising a molecule having a nucleophilic group that initiates solvolysis of said first material to promote structure-directed condensation with said second material, wherein either or both of said first or second material is selected from the group consisting of non-silicon metalloid alkoxides, and metal alkoxides;
inorganic and organic oxygen-containing chelates of silicon, non-silicon metalloids or metals;
inorganic and organic esters, hydrolyzable salts, complexes or conjugates of the hydroxides of silicon, non-silicon metalloids or metals;
and any organic, organometallic and hydrido derivatives of the foregoing.

8. The method of claim 7 wherein one of said first or second material is an organosilicon alkoxide.

9. The method of claim 8 wherein said organosilicon alkoxide is methyl-, phenyl-, or dansylpropyl-triethoxysilane.

10. The method of claim 7 wherein one of said first or second material is a hydrido-silicon alkoxide.

11. The method of claim 10 wherein said hydrido-silicon alkoxide is hydridotriethoxysilane.

12. The method of claim 7 wherein one of said first or second material is a non-silicon metallo alkoxide.

13. The method of claim 12 wherein said non-silicon metallo alkoxide is bis(lactato) titanium.

14. The method of claim 1 wherein either or both of said alkoxides is an organometallo-alkoxide.

15. The method of claim 14 wherein said organometallo-alkoxide is phenyl-bis(lactato) titanium.

16. The method of claim 7 wherein one of said first or second material is a non-silicon hydrido metallo-alkoxide.

17. The method of claim 16 wherein said non-silicon hydrido metallo-alkoxide is hydridobis(lactato) titanium.

18. The method of claim 7 wherein one of said first or second material is a non-silicon metalloid alkoxide.

19. The method of claim 18 wherein said non-silicon metalloid alkoxide is tetraorthoethoxygermanate.

20. The method of claim 7 wherein one of said first or second material is a non-silicon organometalloid alkoxide.

21. The method of claim 20 wherein said non-silicon organometalloid alkoxide is methyl-, phenyl-, or dansylpropyl-trictethoxygermane.

22. The method of claim 7 wherein one of said first or second material is a non-silicon hydrido metalloid alkoxide.

23. The method of claim 22 wherein said non-silicon hydrido metalloid alkoxide is hydrido-triethoxygermane.

24. The method of claim 7 wherein there is formed as a product the corresponding non-silicon metalloid-oxane, metallo-oxane, or mixed poly(silicon/metallo)oxane, polymer networks, or their hydrido, organic, or organometallic derivatives.

25. The method of claim 1 wherein said catalyst molecule is selected from proteins, enzymes, peptides, non-peptide-based polymers, small molecules, supramolecular aggregates, filaments, or arrays or assemblies thereof.

26. The method of claim 25 wherein said catalyst molecule is a protein.

27. The method of claim 25 wherein said catalyst molecule is an enzyme.

28. The method of claim 27 wherein said enzyme is a silicatein.

29. The method of claim 27 wherein said enzyme is a protease.

30. The method of claim 27 wherein said enzyme is a peptidase.

31. The method of claim 27 wherein said enzyme is a hydrolase.

32. The method of claim 31 wherein said hydrolase is selected from the group consisting of amidase, esterase and lipase.

33. The method of claim 27 wherein said enzyme is a catalytic triad enzyme.

34. The method of claim 1 wherein said catalyst molecule is a peptide.

35. The method of claim 34 wherein said peptide contains lysine or poly lysine.

36. The method of claim 34 wherein said peptide contains serine or polyserine.

37. The method of claim 34 wherein said peptide contains a tyrosine.

38. The method of claim 34 wherein said peptide contains a histidine.

39. The method of claim 34 wherein said peptide contains cysteine, oligocysteine or poly-cysteine.

40. The method of claim 34 wherein said peptide contains a nucleophilic catalytic side-chain.

41. The method of claim 40 wherein said nucleophilic catalytic side-chain is contributed by serine, cysteine, histidine or tyrosine.

42. The method of claim 34 wherein said peptide contains a hydrogen-bonding amine.

43. The method of claim 1 wherein said catalyst molecule is a non-peptidebased polymer that operates by a mechanism of catalysis similar to that utilized by silicateins.

44. The method of claim 43 wherein said non-peptide-based polymer contains a hydrogen-bonding amine and/or a nucleophilic group.

45. The method of claim 24 wherein said product is a silsesquioxane.

46. The method of claim 24 wherein said product is a polyorganosiloxane.

47. The method of claim 24 wherein said product is a polymetallo-oxane.

48. The method of claim 24 wherein said product is a polyorganometallooxane.

49. The method of claim 24 wherein said product is a polyorganometalloidoxane.

50. The method of claim 1 in which said catalyst molecule is self-assembling whereby said structure-directed condensation is provided by a spatial array of structure-directing determinants contained on or within the self-assembling catalyst molecule.

51. The method of claim 50 in which said spatial array of structure-directing determinants acts in conjunction with the surfaces of any solid support to which said catalyst molecule is attached or in which said catalyst molecule is confined.

52. The method of claim 50 wherein said catalyst molecule is selected from the group consisting of silicatein, protein, enzyme, peptide, and non-peptide-based polymers, and/or any aggregate, filament, or other assembly thereof.

53. The method of claim 1 in which said nucleophilic group is provided by a hydroxyl or sulfhydryl group.

* * * * *

SEQUENCE LISTING

```
<160> NUMBER OF SEQ ID NOS: 2

<210> SEQ ID NO 1
<211> LENGTH: 330
<212> TYPE: PRT
<213> ORGANISM: Tethya aurantia

<400> SEQUENCE: 1

Met Tyr Leu Gly Thr Leu Val Val Leu Cys Val Leu Gly Ala Ala Ile
1               5                   10                  15

Gly Glu Pro Met Pro Gln Tyr Glu Phe Lys Glu Glu Trp Gln Leu Trp
            20                  25                  30

Lys Lys Gln His Asp Lys Ser Tyr Ser Thr Asn Leu Glu Glu Leu Glu
        35                  40                  45

Lys His Leu Val Trp Leu Ser Asn Lys Lys Tyr Ile Glu Leu His Asn
    50                  55                  60

Ala Asn Ala Asp Thr Phe Gly Phe Thr Leu Ala Met Asn His Leu Gly
65                  70                  75                  80

Asp Met Thr Asp His Glu Tyr Lys Glu Arg Tyr Leu Thr Tyr Thr Asn
                85                  90                  95

Ser Lys Ser Gly Asn Tyr Thr Lys Val Phe Lys Arg Glu Pro Trp Met
            100                 105                 110

Ala Tyr Pro Glu Thr Val Asp Trp Arg Thr Lys Gly Ala Val Thr Gly
        115                 120                 125

Ile Lys Ser Gln Gly Asp Cys Gly Ala Ser Tyr Ala Phe Ser Ala Met
    130                 135                 140

Gly Ala Leu Glu Gly Ile Asn Ala Leu Ala Thr Gly Lys Leu Thr Tyr
145                 150                 155                 160

Leu Ser Glu Gln Asn Ile Ile Asp Cys Ser Val Pro Tyr Gly Asn His
                165                 170                 175
```

```
Gly Cys Lys Gly Gly Asn Met Tyr Val Ala Phe Leu Tyr Val Val Ala
                180                 185                 190
Asn Glu Gly Val Asp Asp Gly Gly Ser Tyr Pro Phe Arg Gly Lys Gln
            195                 200                 205
Ser Ser Cys Thr Tyr Gln Glu Gln Tyr Arg Gly Ala Ser Met Ser Gly
        210                 215                 220
Ser Val Gln Ile Asn Ser Gly Ser Glu Ser Asp Leu Glu Ala Ala Val
225                 230                 235                 240
Ala Asn Val Gly Pro Val Ala Val Ala Ile Asp Gly Glu Ser Asn Ala
                245                 250                 255
Phe Arg Phe Tyr Tyr Ser Gly Val Tyr Asp Ser Ser Arg Cys Ser Ser
            260                 265                 270
Ser Ser Leu Asn His Ala Met Val Ile Thr Gly Tyr Gly Ile Ser Asn
        275                 280                 285
Asn Gln Glu Tyr Trp Leu Ala Lys Asn Ser Trp Gly Glu Asn Trp Gly
    290                 295                 300
Glu Leu Gly Tyr Val Lys Met Ala Arg Asn Lys Tyr Asn Gln Cys Gly
305                 310                 315                 320
Ile Ala Ser Asp Ala Ser Tyr Pro Thr Leu
                325                 330
```

<210> SEQ ID NO 2
<211> LENGTH: 1360
<212> TYPE: DNA
<213> ORGANISM: Tethya aurantia

<400> SEQUENCE: 2

```
atcgaatcaa atcgtgagta ttgctccgag ttccaaggaa agtgaaagca aaggattcca      60
gctacagtaa agatgtatct cggcacgttg gttgttttgt gtgttttggg ggctgctatt     120
ggagagccaa tgcctcagta tgagttcaag gaggaatggc agctgtggaa gaaacaacat     180
gacaagtctt acagcaccaa cttggaggaa ctggagaaac atcttgtctg gctctccaac     240
aagaagtaca ttgaactgca caatgccaat gcagacacct ttggattcac tctagctatg     300
aaccatctag agatatgac tgaccatgaa tacaaggaga gatacctcac atacactaac      360
agcaaatctg gtaactacac caaggtgttc aaacgtgagc catggatggc ctacccggag     420
actgtagatt ggagaacaaa gggcgctgtg actggtatca agagccaggg agattgtggt     480
gccagctatg cattcagtgc catgggtgca cttgaaggaa tcaatgcact tgctactgga     540
aagctgacct atctcagtga acagaacatc attgattgct ctgtacctta tggtaaccat     600
ggttgcaagg gtgaaacat gtatgtggct ttcctctatg ttgttgctaa cgaaggagtt      660
gatgatgggg gttcctatcc atttagagga aagcaatcca gttgtacgta tcaagagcag     720
taccgtggtg caagtatgtc tggctcagtt caaatcaaca gtggtagtga atctgatctg     780
gaagcagctg tagccaatgt tggtccagtt gcagtagcta ttgatggaga gtcaaatgct     840
ttcagattct attacagtgg agtgtacgac tcctccagat gttctagtag cagtctcaac     900
cacgccatgg tgatcactgg ctatggaatt tcaaataacc aggaatactg gcttgcaaag     960
aacagctggg gtgagaactg gggagaactg ggctatgtga agatggccag aacaagtac     1020
aatcaatgtg ggattgctag tgatgcctcc taccccactc tctagcatgt cagccagccc    1080
agtctgaaac tgaactagaa ttatcaatag ttaaataact gtgtgtttta tacatgtgaa    1140
caatagactt gatcatcctt tagtaagtat tatatgtgat gagtgtttgt ccaatccaac    1200
```

```
                                                    -continued
attagctctg acatgtaaat tattgtaata atgattctgt gattatgtct caatgattat      1260
tgtattcaca atggcatcta atttgtatac aagcccctca atcactgact gatctcatta      1320
taatttattt gatggactac aaaaaaaaaa aaaaaaaaa                             1360
```